US007169042B2

(12) United States Patent
Muir et al.

(10) Patent No.: US 7,169,042 B2
(45) Date of Patent: *Jan. 30, 2007

(54) GAMING DEVICE HAVING EXTENDER SYMBOLS

(75) Inventors: David H. Muir, Warnesbay (AU); Gregg J. Palmer, Reno, NV (US); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 900 days.

This patent is subject to a terminal disclaimer.

(21) Appl. No.: 10/191,197

(22) Filed: Jul. 9, 2002

(65) Prior Publication Data

US 2003/0203753 A1 Oct. 30, 2003

Related U.S. Application Data

(60) Provisional application No. 60/376,920, filed on Apr. 30, 2002.

(51) Int. Cl.
*A63F 13/00* (2006.01)
*A63F 9/24* (2006.01)
*G06F 17/00* (2006.01)
*G06F 19/00* (2006.01)

(52) U.S. Cl. ............................ 463/16; 463/20; 463/11; 463/12; 463/42; 463/21; 463/40; 273/138.1; 273/139; 273/292

(58) Field of Classification Search .................... 463/1, 463/10–13, 16–31, 40–43, 46; 273/138.1, 273/139, 292
See application file for complete search history.

(56) References Cited

U.S. PATENT DOCUMENTS 4,722,527 A 2/1988 Gauselmann
5,224,706 A * 7/1993 Bridgeman et al. ........... 463/13
5,308,065 A 5/1994 Bridgeman et al.
5,332,219 A * 7/1994 Marnell et al. ............... 463/13
5,332,228 A * 7/1994 Schultz ........................ 463/13
5,393,057 A * 2/1995 Marnell, II .................. 463/13
5,423,539 A 6/1995 Nagao
5,431,408 A 7/1995 Adams
5,449,173 A 9/1995 Thomas et al.
5,531,440 A * 7/1996 Dabrowski et al. ........... 463/12

(Continued)

FOREIGN PATENT DOCUMENTS

AU B-74936/87 6/1987

(Continued)

OTHER PUBLICATIONS

Wild Streak Advertisement written by WMS Gaming, Inc., published in 2001.

(Continued)

*Primary Examiner*—Xuan M. Thai
*Assistant Examiner*—Binh-An D. Nguyen
(74) *Attorney, Agent, or Firm*—Bell, Boyd & Lloyd LLC

(57) ABSTRACT

A gaming device including a plurality of reels or cards having several symbols. The symbols include at least one extender symbol. In one embodiment, when the extender symbol is randomly generated on the reels, one of the symbols randomly generated on the reels changes into another of the symbols randomly generated on the reels.

21 Claims, 24 Drawing Sheets

U.S. PATENT DOCUMENTS

| | | | | |
|---|---|---|---|---|
| 5,720,662 | A | 2/1998 | Holmes, Jr. et al. | |
| 5,823,873 | A | 10/1998 | Moody | |
| 5,980,384 | A * | 11/1999 | Barrie | 463/16 |
| 6,059,658 | A | 5/2000 | Mangano et al. | |
| 6,089,977 | A | 7/2000 | Bennett | |
| 6,093,102 | A | 7/2000 | Bennett | |
| 6,095,921 | A * | 8/2000 | Walker et al. | 463/20 |
| 6,120,031 | A | 9/2000 | Adams | |
| 6,142,872 | A | 11/2000 | Walker et al. | |
| 6,159,095 | A | 12/2000 | Frohm et al. | |
| 6,190,254 | B1 | 2/2001 | Bennett | |
| 6,220,959 | B1 | 4/2001 | Holmes, Jr. et al. | |
| 6,251,013 | B1 | 6/2001 | Bennett | |
| 6,261,177 | B1 * | 7/2001 | Bennett | 463/16 |
| 6,270,411 | B1 * | 8/2001 | Gura et al. | 463/20 |
| 6,290,600 | B1 * | 9/2001 | Glasson | 463/20 |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,311,976 | B1 | 11/2001 | Yoseloff et al. | |
| 6,312,334 | B1 * | 11/2001 | Yoseloff | 463/25 |
| 6,322,078 | B1 | 11/2001 | Adams | |
| 6,358,144 | B1 | 3/2002 | Kaddlic et al. | |
| 6,413,162 | B1 * | 7/2002 | Baerlocher et al. | 463/20 |
| 6,419,579 | B1 | 7/2002 | Bennett | |
| 6,428,412 | B1 * | 8/2002 | Anderson et al. | 463/9 |
| 6,439,993 | B1 | 8/2002 | O'Halloran | |
| 6,454,266 | B1 | 9/2002 | Breeding et al. | |
| 6,494,454 | B1 | 12/2002 | Adams | |
| 6,517,433 | B1 * | 2/2003 | Loose et al. | 463/20 |
| 6,554,704 | B1 * | 4/2003 | Nicastro et al. | 463/20 |
| 6,565,433 | B1 * | 5/2003 | Baerlocher et al. | 463/20 |
| 6,604,740 | B1 | 8/2003 | Singer et al. | |
| 6,616,142 | B1 | 9/2003 | Adams | |
| 6,719,630 | B1 * | 4/2004 | Seelig et al. | 463/16 |
| 6,780,109 | B1 * | 8/2004 | Kaminkow | 463/20 |
| 6,786,818 | B1 * | 9/2004 | Rothschild et al. | 463/20 |
| 6,805,632 | B1 * | 10/2004 | Suda | 463/25 |
| 6,808,454 | B1 * | 10/2004 | Gerrard et al. | 463/20 |
| 2001/0019965 | A1 * | 9/2001 | Ochi | 463/25 |
| 2003/0045354 | A1 * | 3/2003 | Giobbi | 463/40 |
| 2003/0060267 | A1 * | 3/2003 | Glavich et al. | 463/20 |
| 2003/0064768 | A1 * | 4/2003 | Fier | 463/13 |
| 2003/0203753 | A1 * | 10/2003 | Muir et al. | 463/20 |

FOREIGN PATENT DOCUMENTS

| | | | |
|---|---|---|---|
| AU | 199717601 | B2 | 9/1997 |
| AU | 199917318 | A1 | 9/1999 |
| EP | 0410789 | | 2/1990 |
| EP | 0737494 | | 12/1994 |
| EP | 0984408 | A2 | 3/2000 |
| EP | 1039424 | | 3/2000 |
| EP | 1063622 | | 5/2000 |
| WO | WO 9732285 | | 9/1997 |
| WO | WO 00/66235 | | 11/2000 |
| WO | WO 00/76606 | A1 | 12/2000 |

OTHER PUBLICATIONS

Penguin Pays Advertisement written by Aristocrat Incorporated, published in 1998.

Black Swan Paytable Display written by IGT, published prior to 2001.

Jackpot Party Brochure and Articles written by WMS Gaming, Inc, published in 1988.

The Basics of Winning Video Poker (Chapter VI Deuces Wild & Chapter VII Jokers Wild) written by J. Edward Allen, published in 1990.

Enchanted Unicorn Advertisement written by IGT, published in 2001.

Introducing the "Smiling Ape" Machine Advertisement (including Joker's Wild Poker description) written by IGT, published prior to 2001.

Your Real Key to Gaming Success Advertisement (including Roll Over Beethoven and Wild Fortune) written by Olympic Video Gaming, published dated unknown.

Description of Symbol Feature in Australian UFO Gaming MAchine written by Barcrest Ltd., published in 1995.

Reel Magic™ Gaming Machine Description written by IGT, available in 1986.

Enchanted Forest™ Gaming Description from Aristocrat, available in 1994.

Joker's Wild Advertisement written by IGT, published prior to 2001.

Happy Camper Advertisement written by IGT, published in 2001.

Fishin' Buddies Article published in Strictly Slots/Anchor Games, published in Apr. 2001.

Boot Scootin Article written by Strictly Slots/Aristocrat Leisure Industries, PTY Ltd., published date unknown.

Little Green Men, Jr. Advertisement written by A.C. Coin and Slot Services Company, published prior to 2002.

Cash Chameleon Article written by Strictly Slots/Aristocrat Leisure Industries, PTY Ltd., published in Apr. 2001.

Loco Loot Article written by Strictly Slots/Aristocrat Leisure Industries, PTY Ltd., published in May 2002.

Mountain Money Article written by Strictly Slots/Aristocrat Leisure Industries, PTY Ltd., published in Jun. 2002.

Break the Spell Article written by Strictly Slots/Atronic Casino Technology, Ltd., published in Sep. 2000.

Break the Spell Atronic Web Page, published in Jan. 2001.

Break the Spell Brochure, published in 1999.

Double Diamond Line Advertisement written by Bally Gaming Systems, published in 2000.

Cossack Dance Advertisement written by Olympic Video Gaming, published prior to 2002.

Bach, Peter, "Collector's Treasury of Antique Slot Machines from Contemporary Advertising," Post-Era Books, 1980.

* cited by examiner

GAMING DEVICE HAVING EXTENDER SYMBOLS

PRIORITY CLAIMS

This application claims priority to and the benefits of U.S. Provisional Patent Application Ser. No. 60/376,920, filed April 30, 2002.

CROSS REFERENCE TO RELATED APPLICATIONS

This application relates to the following co-pending commonly owned applications: "GAMING DEVICE HAVING DUAL EVALUATION SCHEME," Ser. No. 09/687,689, "GAMING DEVICE HAVING TRANSFORMABLE WILD SYMBOLS OR CARDS WITH WILD SIGNAL INDICATORS," Ser. No. 09/957,305, "GAMING DEVICE HAVING WILD INDICATORS," Ser. No. 09/960,883, "GAMING DEVICE WITH WILD ACTIVATION SYMBOLS AND WILD TERMINATION SYMBOLS," Ser. No. 09/964,102, "GAMING DEVICE HAVING A VARIED WILD SYMBOL IN A BONUS GAME," Ser. No. 10/243,512, "GAMING DEVICE HAVING SYMBOLS WITH TRANSFORMATION PROBABILITIES," Ser. No. 10/255,880, and "GAMING DEVICE HAVING RESULTANT WILD SYMBOLS," Ser. No. 10/191,154.

BACKGROUND OF THE INVENTION

Gaming devices are well known. Many known gaming devices provide wild symbols or wild cards. Wild symbols provide a player with an additional opportunity to obtain winning combinations. Wild symbols, wild cards and wild indicators in gaming devices also provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that combination.

In another example, the gaming scheme is a video poker game. The gaming device displays five cards. The cards are a ten, Jack, Queen, King and wild card. The wild card substitutes as an Ace and provides the player with a winning combination.

Wild cards have been employed in gaming devices in other manners. For example, U.S. Pat. No. 5,431,408 discloses a gaming device having a video poker gaming scheme. A player is dealt a hand consisting of five cards. The player is also given a wild card. The wild card is separate from the dealt hand. The player can reserve the wild card for use with a subsequent hand. Thus, the player can use the wild card in a hand in which it is most advantageous to do so.

In another example, U.S. Pat. No. 6,089,977 discloses a gaming device having a set of virtual reels. The reels display a set of symbols. Certain symbol combinations serve as triggering events. When one of these combinations occur on the reels, a wild card symbol appears on the reels in the form of a graphical image and appears at different locations on the reels. When the wild card symbol appears at each location, the symbol at that location transforms into the wild card symbol. After each activation of the wild symbol, the gaming device determines and pays the player for any winning combination which is the result of the transformation. When the wild symbol appears at the next symbol, the symbol previously transformed is in its original state.

To increase player enjoyment and excitement, it is desirable to provide gaming devices having new and different wild symbols, wild indicators and wild card schemes.

SUMMARY OF THE INVENTION

The present invention in one embodiment provides a gaming device having resultant wild symbols on a set of reels, on a set of cards or on another set of symbols. The resultant wild symbols are formed from at least two complimentary wild symbols on adjacent or related reels, cards or symbols. The resultant wild symbols act as wild symbols or transform other symbols or cards into wild symbols or wild cards.

In one embodiment of the present invention, the gaming device includes a set of reels having a plurality of symbols displayed within a display device. The plurality of symbols includes at least one resultant wild symbol. The resultant wild symbol includes first and second complimentary wild symbols on adjacent reels. The complimentary wild symbols are positioned on different reels adjacent to one or more symbols on the reels. The complimentary wild symbols are displayed on either side of such symbols. Each complimentary wild symbol is in this embodiment represented by a portion of an image. In one example of this embodiment, the complimentary wild symbols are in the form of left and right halves of a star. In another example of this embodiment, the complimentary wild symbols are in the form of left and right halves of a square. It should be appreciated that any indicia or image could be used to represent the complimentary wild symbols.

In this embodiment, when the complimentary wild symbols are in alignment along a payline of the display device, they combine to create the resultant wild symbol. For example, when a first reel displays a complimentary wild symbol in the form of a left half of a star on the payline, and the adjacent or second reel displays a complimentary wild symbol in the form of a right half of a star on the payline, the processor of the gaming device combines the complimentary wild symbols to create the resultant wild symbol. In this case, the resultant wild symbol is in the form of a complete star. The resultant wild symbol functions as a wild symbol which substitutes for any symbol or a limited group of symbols used in the game to maximize the award.

In one embodiment, when the resultant wild symbol is created within the display device, the processor transforms one or more of the symbols on the reels adjacent to the complimentary wild symbols into a wild symbol. These wild symbols can then substitute for any other symbols or a limited group of symbols used by the gaming device.

In one embodiment, the display device displays a set of cards in a video poker game. At least two cards include a resultant wild symbol. The resultant wild symbol includes a first and second complimentary wild symbol displayed on a first and second card, respectively, which are adjacent or related to each other. In one example, a first card displays a first complimentary wild symbol which is represented by a left half of a square. An adjacent or second card displays a second complimentary wild symbol which is represented by a right half of a square. Because the left half and the right half of the square are complimentary, the processor combines the complimentary wild symbols to create a resultant wild symbol. The resultant wild symbol is played with the rest of the cards, or one or both cards displaying the resultant wild symbol are transformed into wild cards.

In one embodiment, there is a plurality of resultant wild symbols on a set of reels within a display device. In this embodiment, the processor can substitute each resultant wild symbol for symbols or a limited group of symbols used by the gaming device. This can be performed simultaneously, successively or in any combination thereof. In an alternative embodiment, there is a plurality of resultant wild symbols displayed within the display device and the processor transforms symbols adjacent to the resultant wild symbols into wild symbols. The processor transforms the adjacent symbols into wild symbols simultaneously, successively, or in any combination thereof.

In one embodiment, there is a plurality of resultant wild symbols on a set of cards displayed on the display device. The processor transforms those cards displaying the resultant wild symbols into wild cards either simultaneously, successively, or in any combination thereof.

In an alternative embodiment, at least one extender symbol is included on one or more of the reels displayed to a player. The extender symbol extends one or more symbols horizontally, vertically, diagonally or in any other manner across the reels when the extender symbol occurs on one or more reels. The extender symbol may extend a symbol or symbols across a predetermined number of cells or a random number of cells. In one embodiment, the extender symbol acts as a wild symbol. In another embodiment, the extender symbol is included on one or more cards in a set of cards. In this embodiment, the extender symbol extends one or more of the card symbols across at least one card in the set.

It is therefore an advantage of the present invention to provide a gaming device having resultant wild symbols that provide a player with an additional opportunity to obtain a winning combination in a game.

It is another advantage to provide a gaming device having at least one extender symbol that extends symbols and provides a player with an additional opportunity to obtain a winning combination in a game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
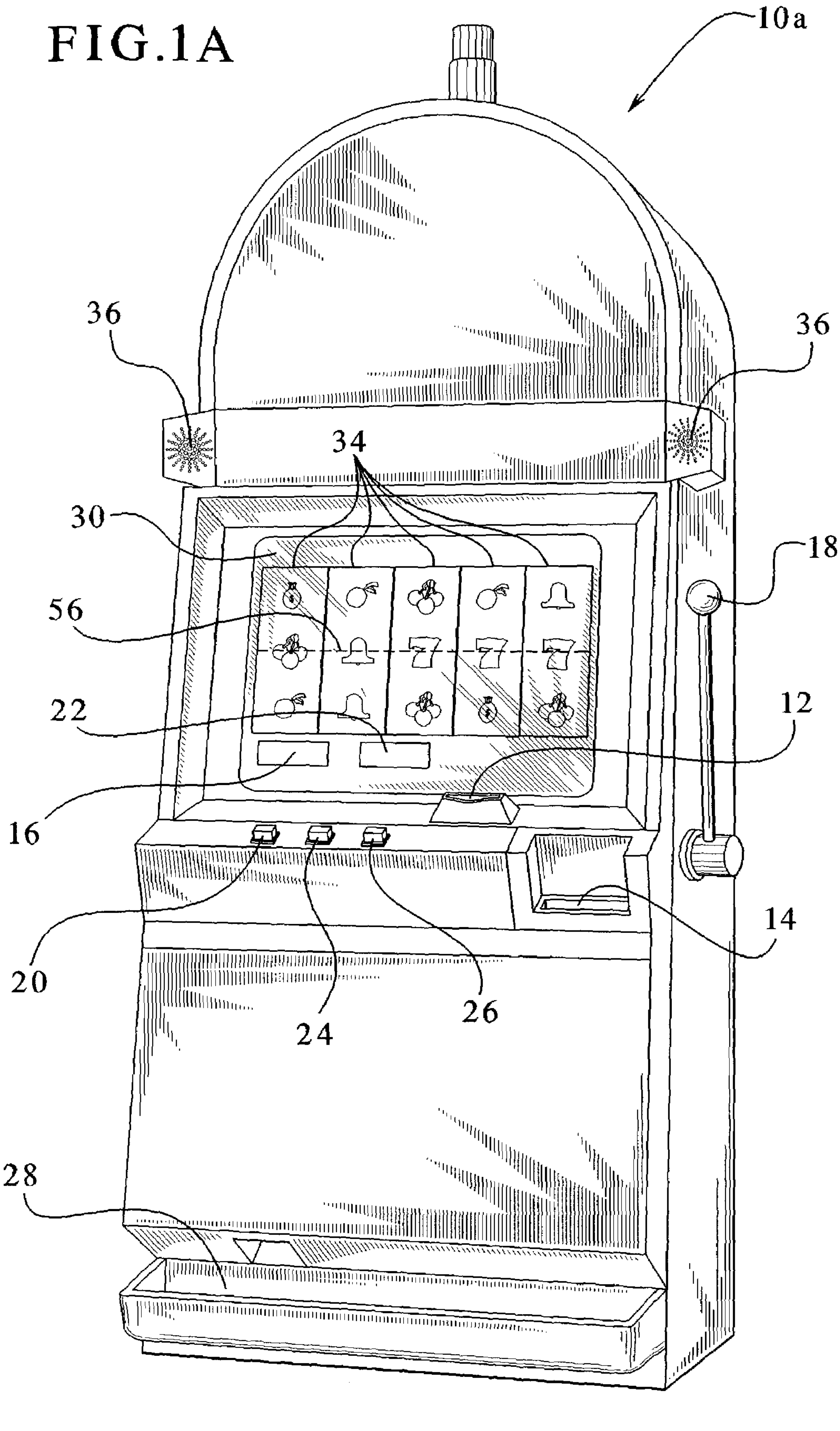
FIGS. 1A and 1B are perspective views of alternative embodiments of the gaming device of the present invention.
Figure 1B:
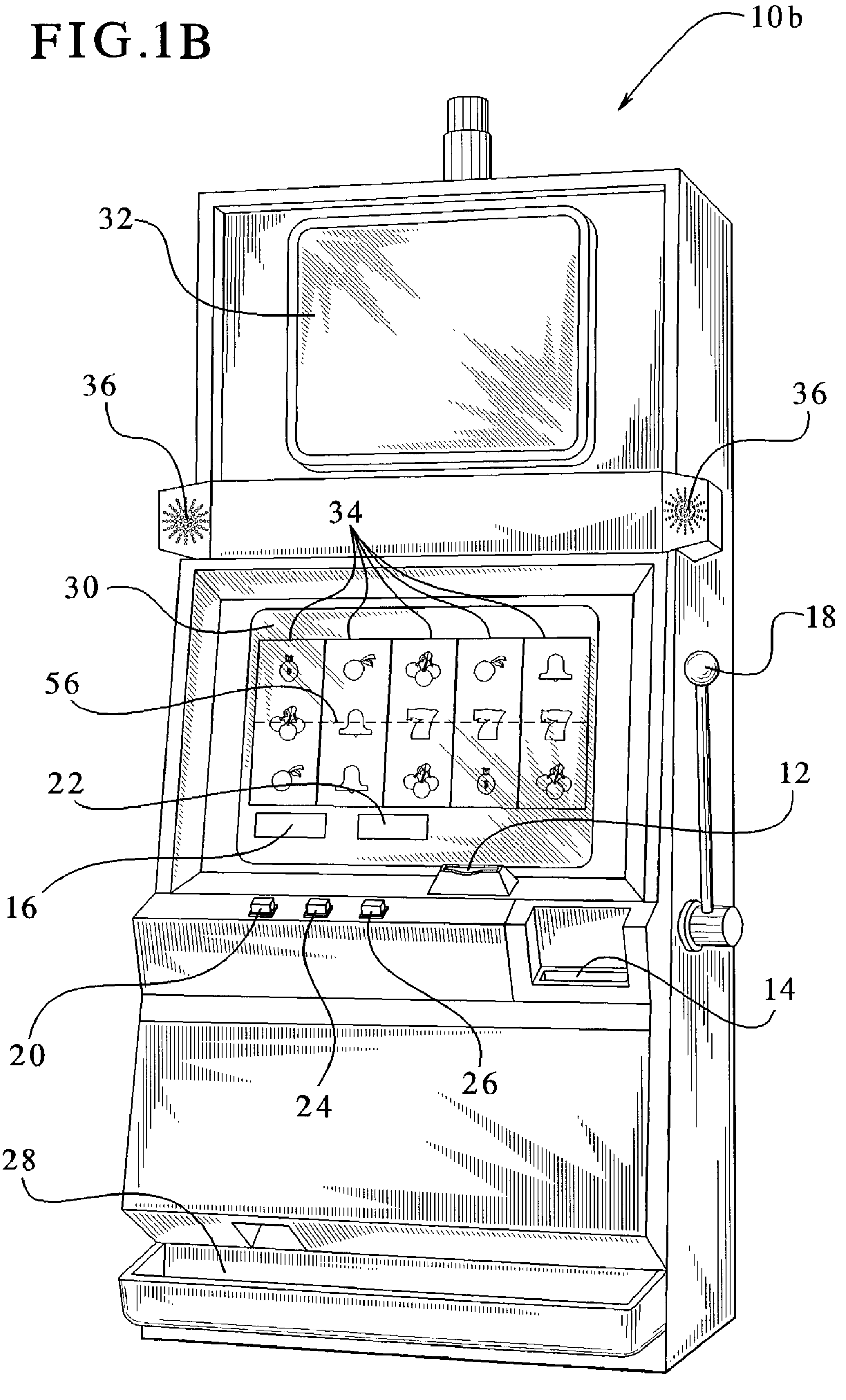

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game, described below, being a primary game or a bonus or secondary game that coordinates with a base game. When the game of the present invention is a bonus game, gaming device 10 in one base game can be a slot machine having the controls, displays and features of a conventional slot machine, or a video card game such as poker, blackjack, etc. The player can operate the gaming device while standing or sitting. The gaming device may be a pub-style or table-top game (not shown), which a player operates while sitting.

The base games of the gaming device 10 may include slot, poker, or blackjack, among others. The gaming device 10 may also include any bonus triggering events, bonus games as well as any progressive game coordinating with these games. The symbols and indicia used for any of the base, bonus and progressive games include mechanical, electrical, electronic, or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 may also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may "cash out" by pushing a cash out button 26 to receive coins or tokens in the coin payout tray 28 or other forms of payment, such as an amount printed on a ticket or credited to a credit card, debit card or smart card.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards.

The slot machine base game of gaming device 10 displays a plurality of reels 34, such as three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
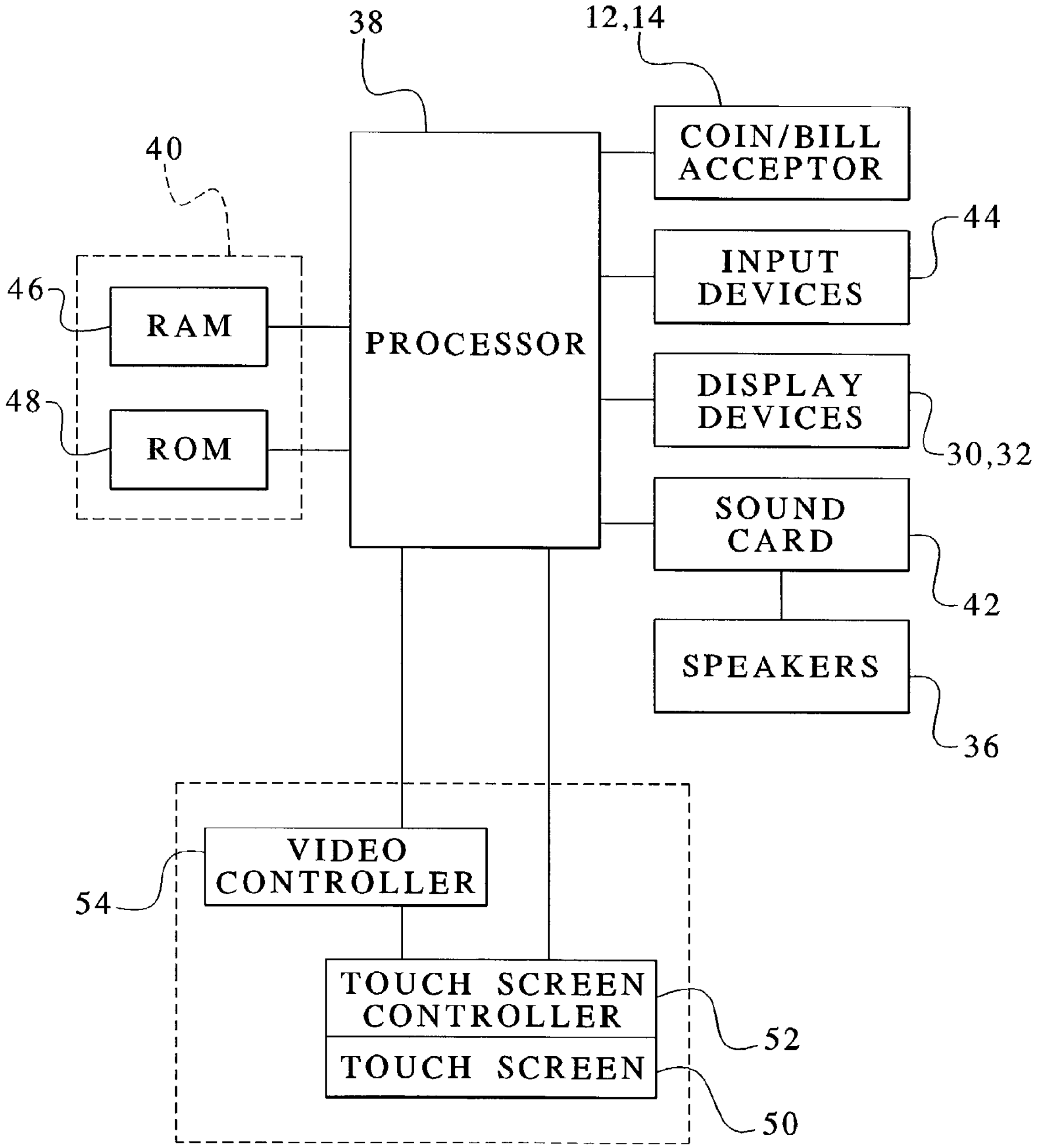
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54. As further seen in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

Resultant Wild Symbols

Figure 3:
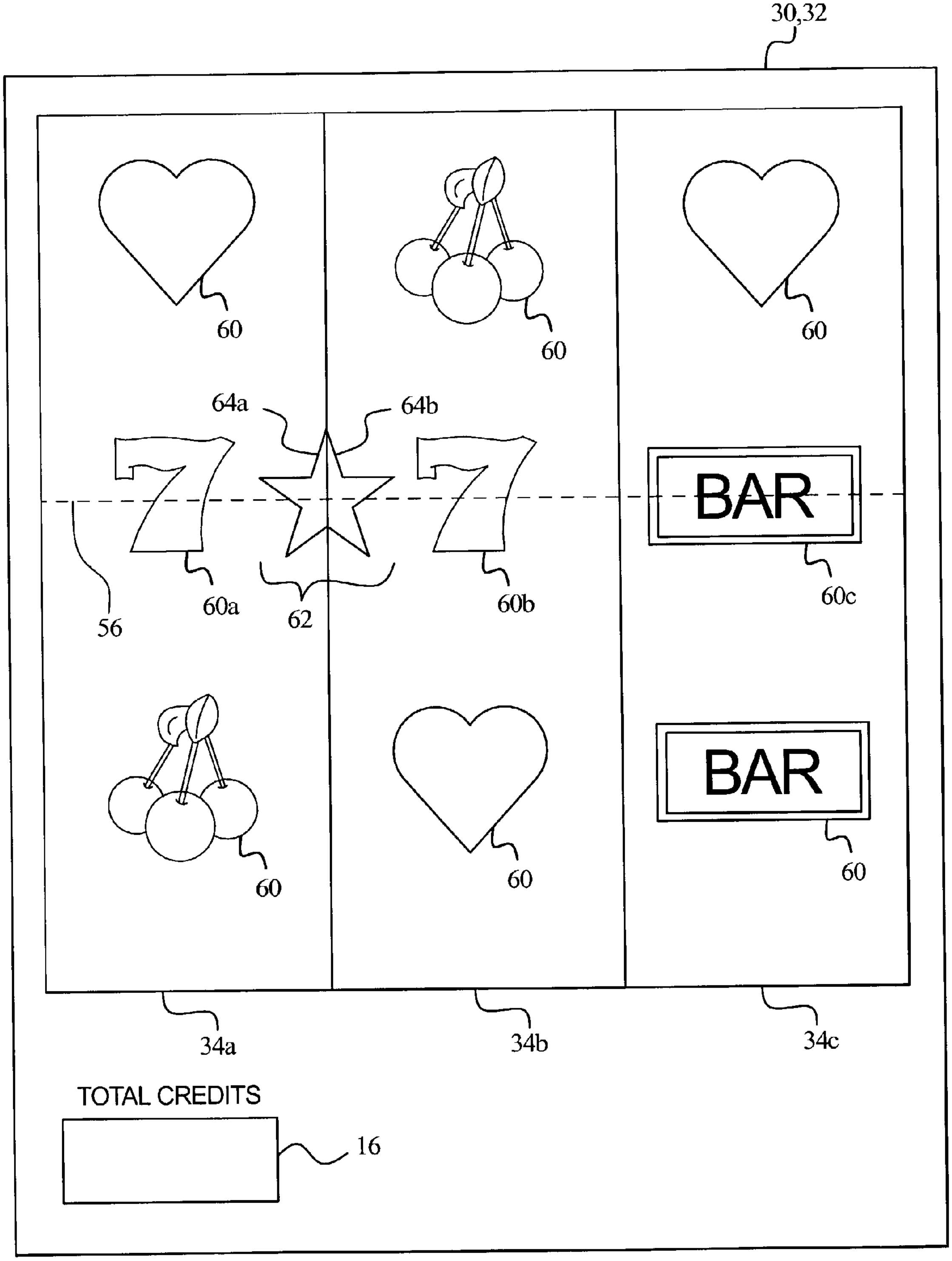
FIG. 3 is a front plan view of a display device displaying a set of reels including a resultant wild symbol.

In one embodiment of the present invention, the display device 30 displays three reels 34*a*, 34*b* and 34*c*, as illustrated in FIG. 3. The reels contain a set of symbols 60 such as hearts, cherries, numbers, or any other suitable symbols. The reels include at least one resultant wild symbol 62. The resultant wild symbol 62 includes at least two complimentary wild symbols 64*a* and 64*b* on adjacent or related reels 34*a* and 34*b*. The complimentary wild symbols are, for example, represented by portions of an image. In one embodiment, each complimentary wild symbol is in the form of a portion of a word, design, picture, or the like. In one embodiment, each complimentary wild symbol is in the form of a portion of a symbol used by the gaming device. Preferably, the complimentary wild symbols are displayed on either side of the symbols. It should be appreciated that the resultant wild symbol may be associated with one or more awards including but not limited to multipliers, free games and free spins.

Figure 4:
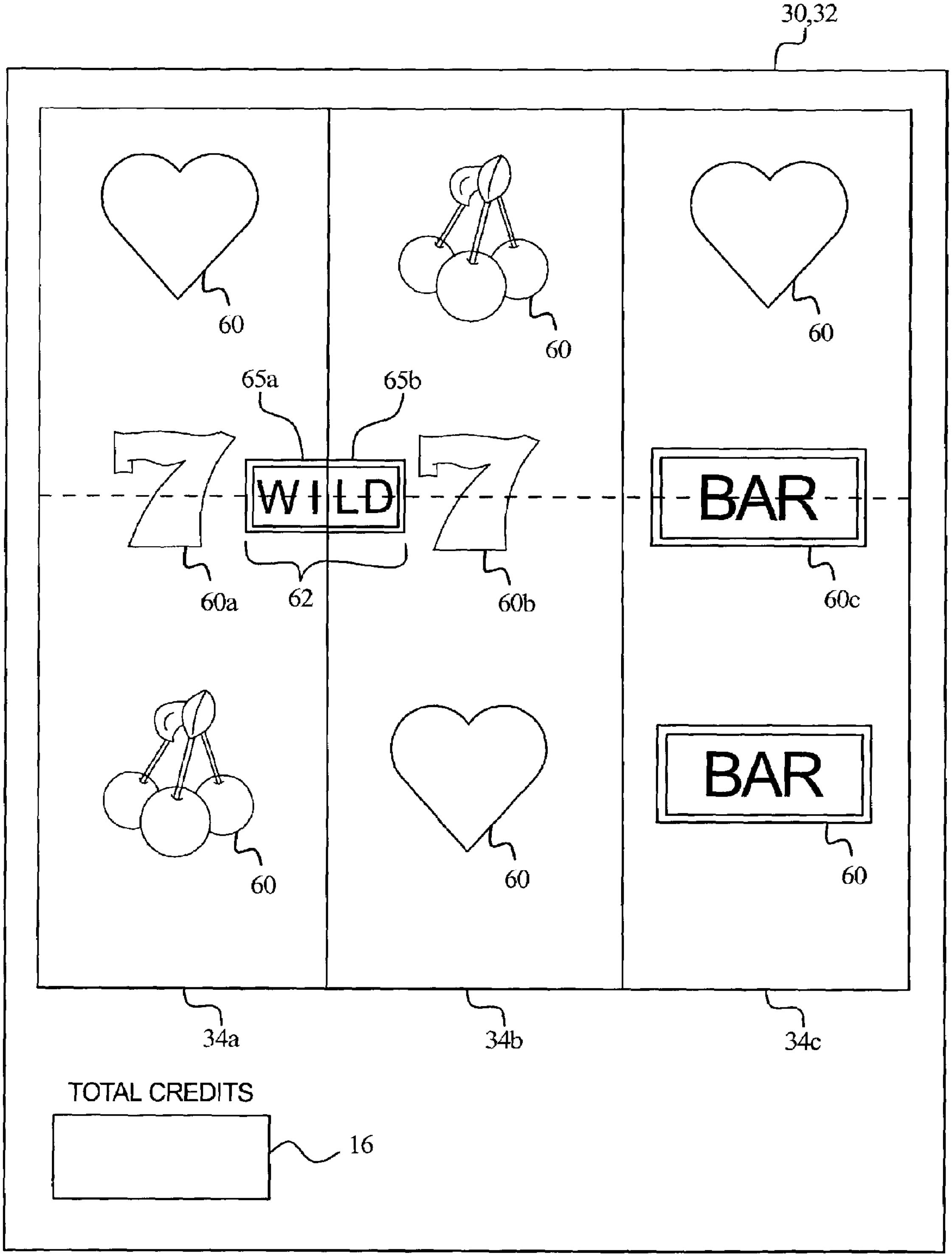
FIG. 4 is a front plan view of a display device displaying a set of reels in which the resultant wild symbol is transformed into a wild symbol.

In the illustrated embodiment of FIG. 3, a player uses the control features of the gaming device to cause the reels to spin. When the reels stop spinning, the first reel 34*a* includes the "7" symbol 60*a* and a complimentary wild symbol 64*a* in the form of a left half of a star along a payline 56, as illustrated in FIG. 3. The second reel 34*b* includes a complimentary wild symbol 64*b* in the form of a right half of a star and the "7" symbol 60*b*. The third reel includes the "BAR" symbol 60*c*. The processor combines the complimentary wild symbols 64*a* and 64*b* to create the resultant wild symbol 62. The resultant wild symbol 62 functions as a wild symbol that combines with the adjacent symbols 60*a* and 60*b* to form a winning combination of three "7"s, as illustrated in FIG. 4. The processor awards the player for the winning by displaying the player's new credit total in the credit display 16.

In one embodiment, the gaming device provides a signal to the player that the complimentary wild symbols 64*a* and 64*b* have combined to create a resultant wild symbol 62. In this embodiment, the signal is the displaying of the word "WILD" through symbols 65*a* and 65*b*. The signal may also be a sound or message emitted by a speaker. Other suitable audio or visual methods of notifying a player are contemplated by the present invention.

Figure 5A:
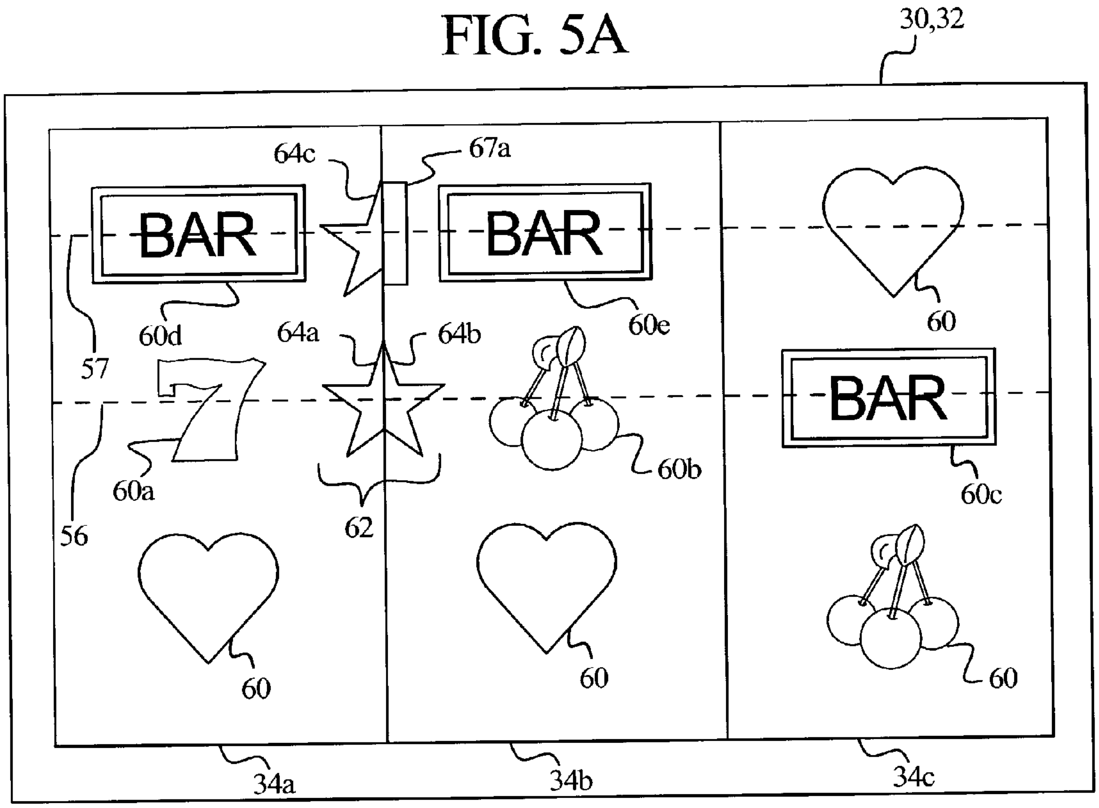
FIGS. 5A and 5B are front plan views of a display device displaying a set of reels in which a resultant wild symbol is transformed into a wild symbol.
Figure 5B:
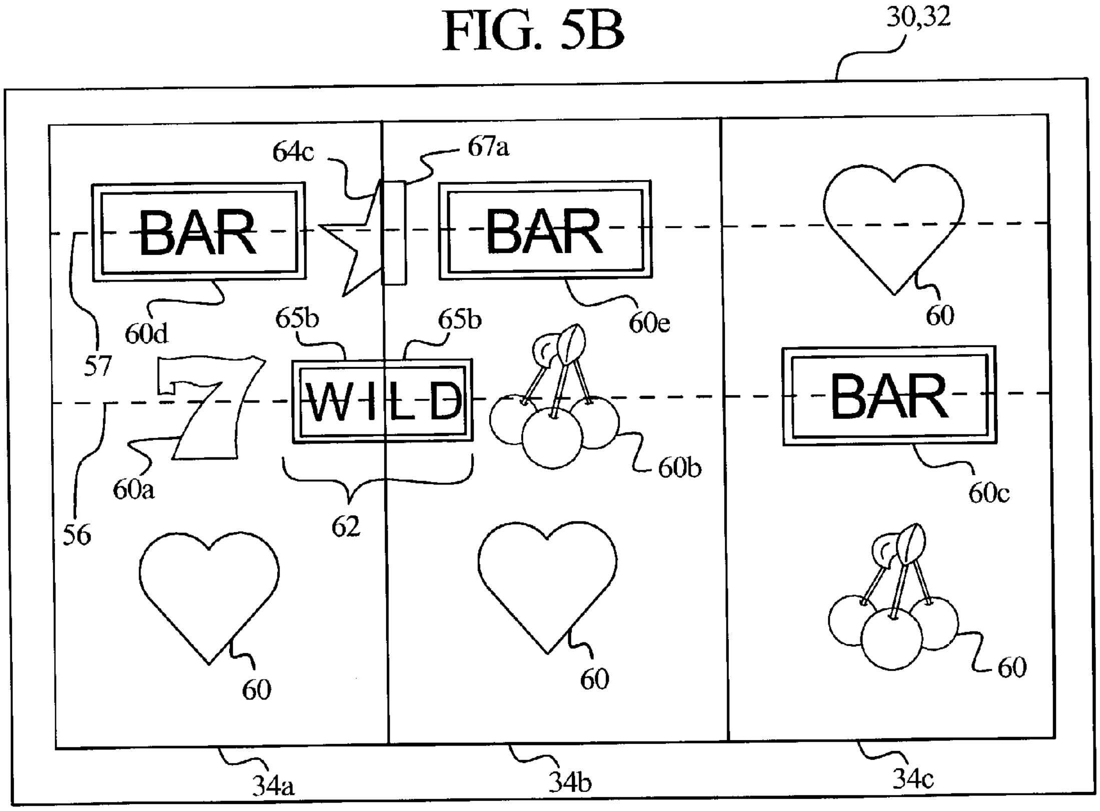

In another example, a first reel 34*a* includes a "BAR" symbol 60*d* and a complimentary wild symbol 64*c* in the form of a left half of a star along a payline 57, as illustrated in FIG. 5A. The first reel also includes the "7" symbol and a complimentary wild symbol 64*a* in the form of a left half of a star. The second reel includes a complimentary wild symbol 67*a* in the form of a right half of a square and a "BAR" symbol 60*e* in the upper portion of the display device. The second reel also includes a complimentary wild symbol 64*b* in the form of a right half of a star and a cherry symbol 60*b*. No resultant wild symbol is created with respect to symbols 64*c* and 67*a*. However, the processor combines the complimentary wild symbols 64*a* and 64*b* to create a resultant wild symbol 62, as illustrated in FIG. 5B. According to the paytable of the gaming device, the player is not awarded any credits for obtaining two "7"s, two cherry symbols or two "BAR" symbols. If the third reel had included a cherry symbol along payline 56, the player would have been awarded for having three cherries. This embodiment illustrates multiple resultant wild symbols, as well as multiple complimentary wild symbols which are the same on one reel and are both adapted to match a single complimentary wild symbol on another reel.

Figure 6:
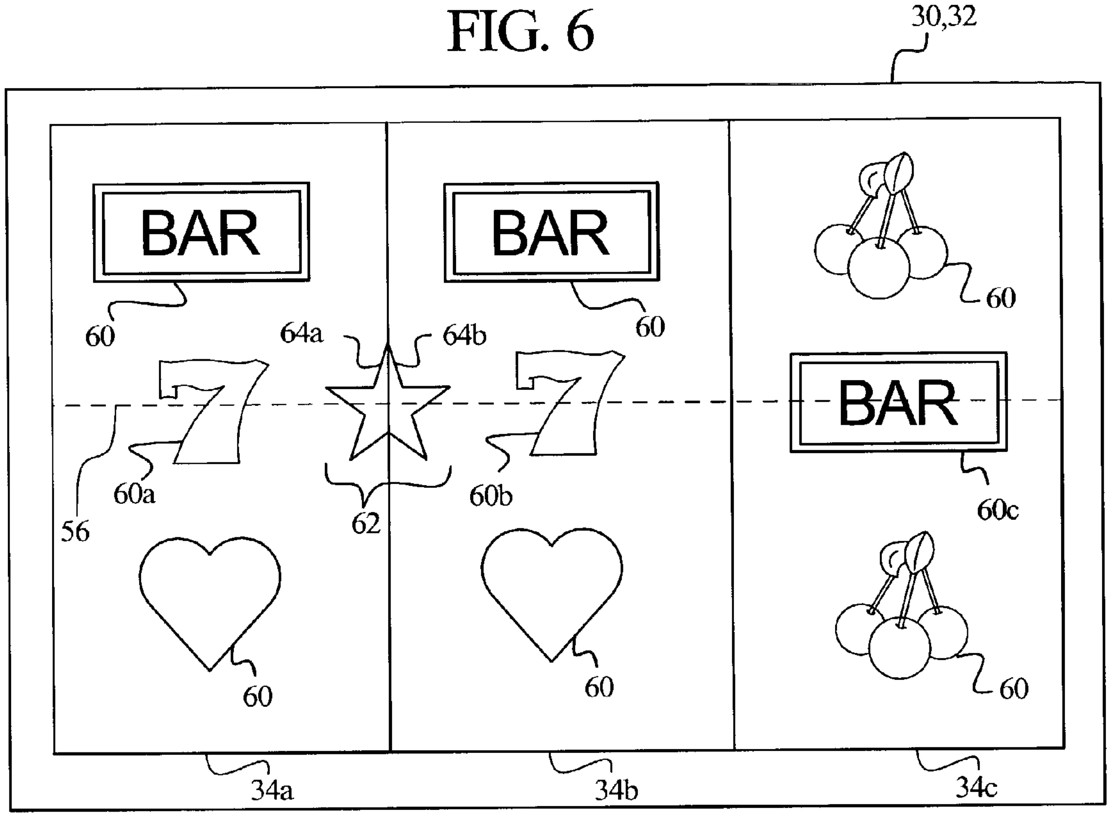
FIG. 6 is a front plan view of a display device displaying a set of reels including a resultant wild symbol.
Figure 7:
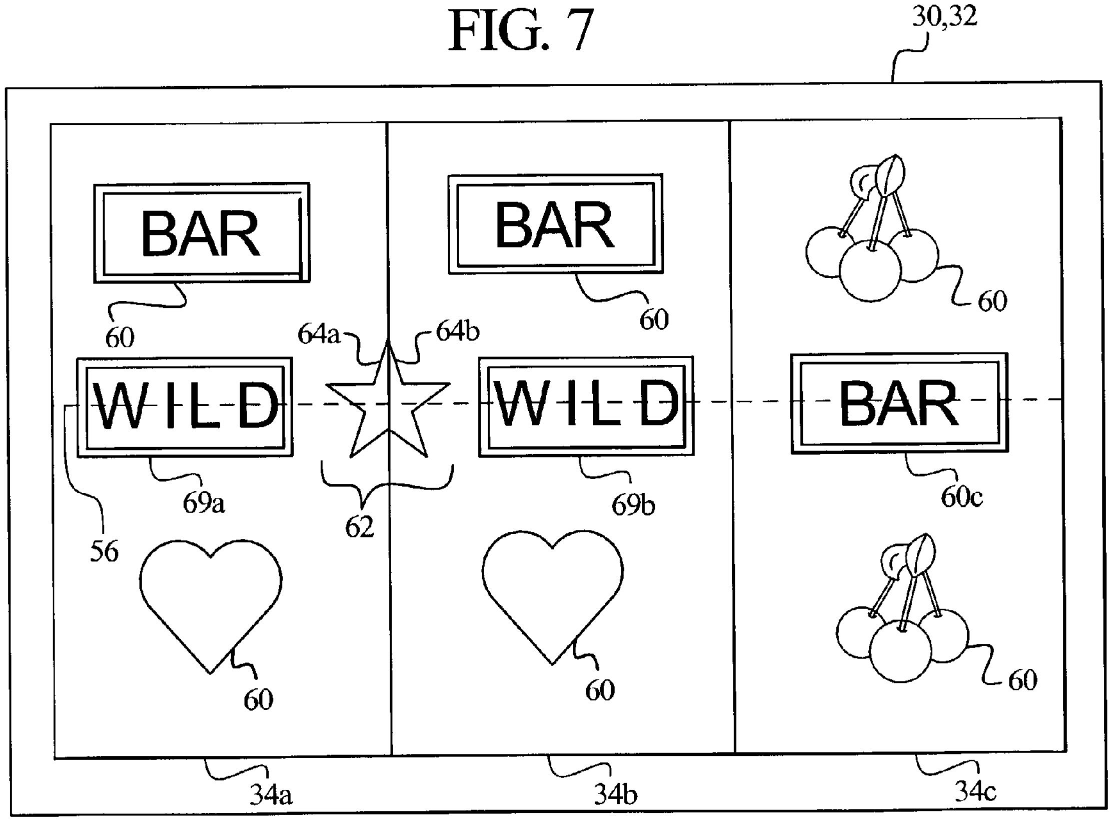
FIG. 7 is a front plan view of a display device displaying a set of reels in which the resultant wild symbol transforms symbols on the reels into wild symbols.

In one embodiment, the processor transforms one or more symbols adjacent to resultant wild symbol into wild symbols. For example, within the display device, a first reel includes the "7" symbol 60*a* and a complimentary wild symbol 64*a* in the form of a left half of a star along payline 56, as illustrated in FIG. 6. The second reel 34*b* includes a complimentary wild symbol 64*b* in the form of a right half of a star along payline 56 as well as the "7" symbol 60*b*. The third reel includes a "BAR" symbol 60*c*. The processor combines the complimentary wild symbols to create a resultant wild symbol 62. As a result, the "7" symbol 60*a* displayed on the first reel and the "7" symbol 60*b* on the second reel become wild symbols 69*a* and 69*b* as illustrated in FIG. 7. The wild symbols combine with the BAR symbol on the third reel to provide three "BAR" symbols along the payline 56.

Figure 8A:
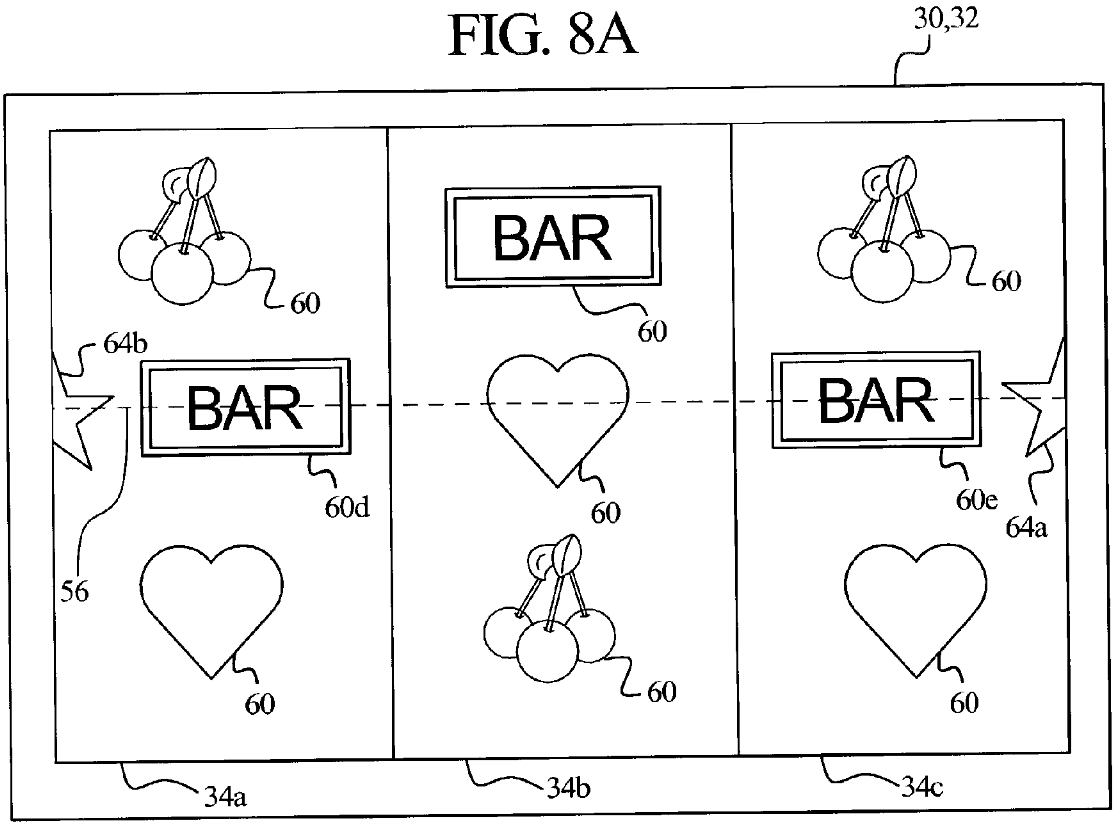
FIGS. 8A and 8B are front plan views of a display device displaying a set of reels in which a resultant wild symbol transforms into a wild symbol.
Figure 8B:
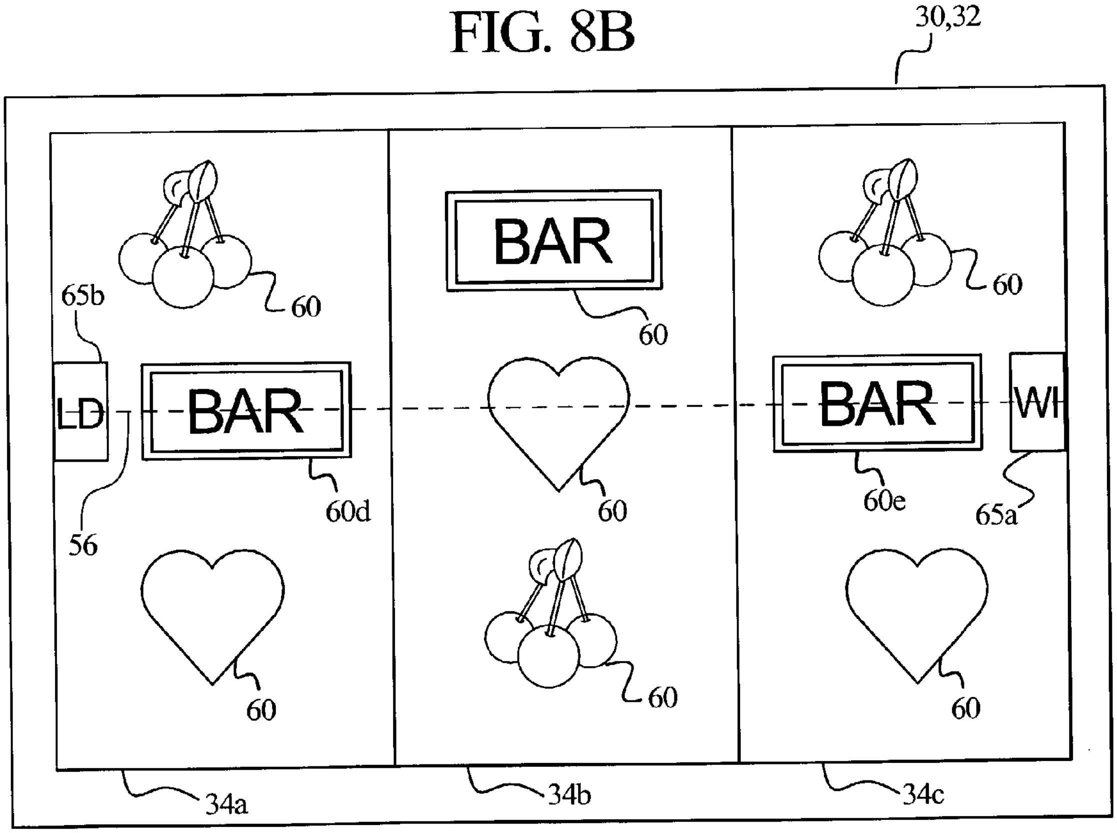

In one embodiment, the processor creates a resultant wild symbol by combining complimentary wild symbols on non-adjacent reels. For example, in a gaming device having three reels, complimentary wild symbols 64*a* and 64*b* are present along a payline 56 on the first and third reels, respectively, as illustrated in FIG. 8A. The first reel includes a complimentary wild symbol 64*b* in the form of a right half of a star and a "BAR" symbol 60*d*. The third reel includes a "BAR" symbol 60*e* and a complimentary wild symbol 64*a* in the form of a left half of a star. The complimentary wild symbols 64*b* and 64*a* on the first and third reels, respectively, are combined by the processor to create a resultant wild symbol. The processor then combines the "BAR" symbol 60*d* on the first reel with the resultant wild symbol and the "BAR" symbol 60*e* on the third reel to produce three "BAR" symbols as illustrated in FIG. 8B. The processor awards the player for the winning combination. It should be appreciated that this type of combination of complimentary wild symbols is not limited to embodiments having three reels, and can include any number of reels where complimentary wild symbols are present on two related or adjacent reels.

Figure 9:
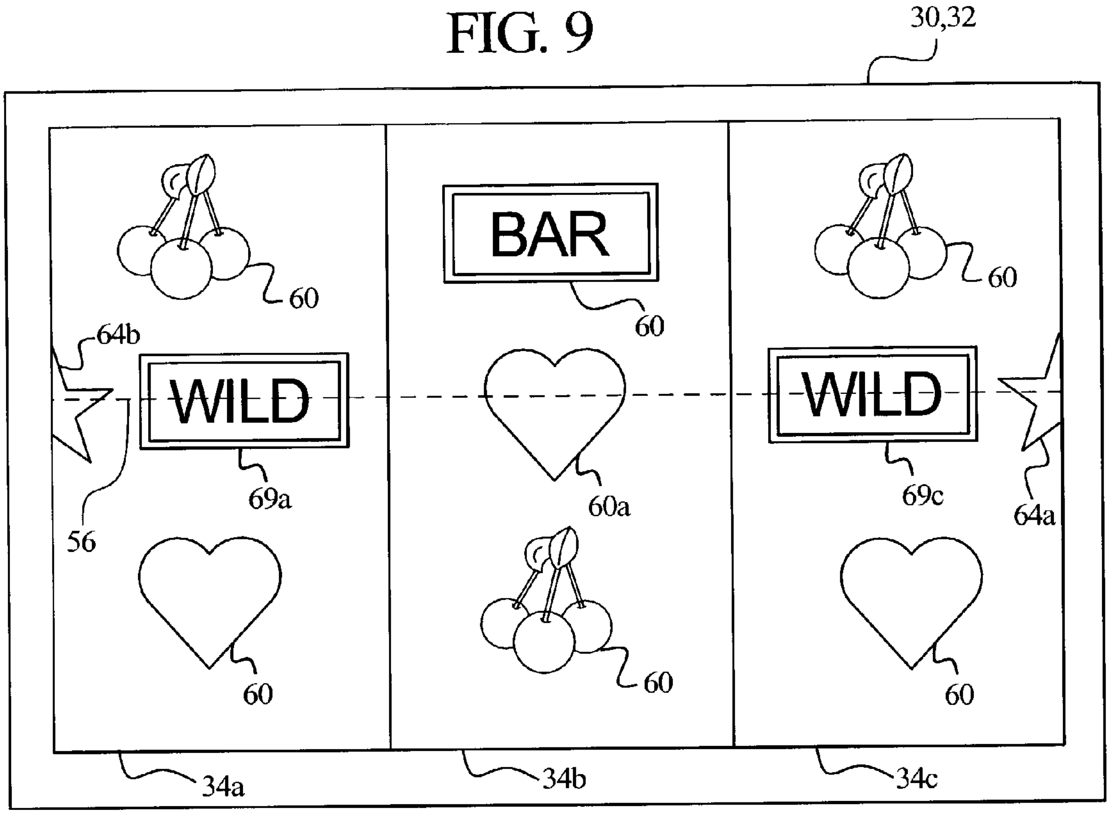
FIG. 9 is a front plan view of a display device displaying a set of reels in which symbols on the reels become wild symbols.

In an alternative embodiment, the symbols adjacent to the resultant symbol become wild symbols as a result of the complimentary wild symbol combination. The "BAR" symbols 60*d* and 60*e* on the payline 56 of the first and third reels become wild symbols 69*a* and 69*c*, respectively, as illustrated in FIG. 9. The second reel 34*b* includes a heart symbol 60*a*; as a result, the wild symbols each substitute for a heart symbol. The player obtains three heart symbols and is provided any associated award.

In a further embodiment, the gaming device provides the player with a plurality of spins at the beginning of the game. The player or the processor spins the reels until there are no spins remaining in the game.

In still a further embodiment, a probability of occurring on the reels is associated with each resultant wild symbol such that the probability of one resultant wild symbol occurring on the reels is greater than the probability of two or more resultant wild symbols occurring on the reels.

Figure 10:
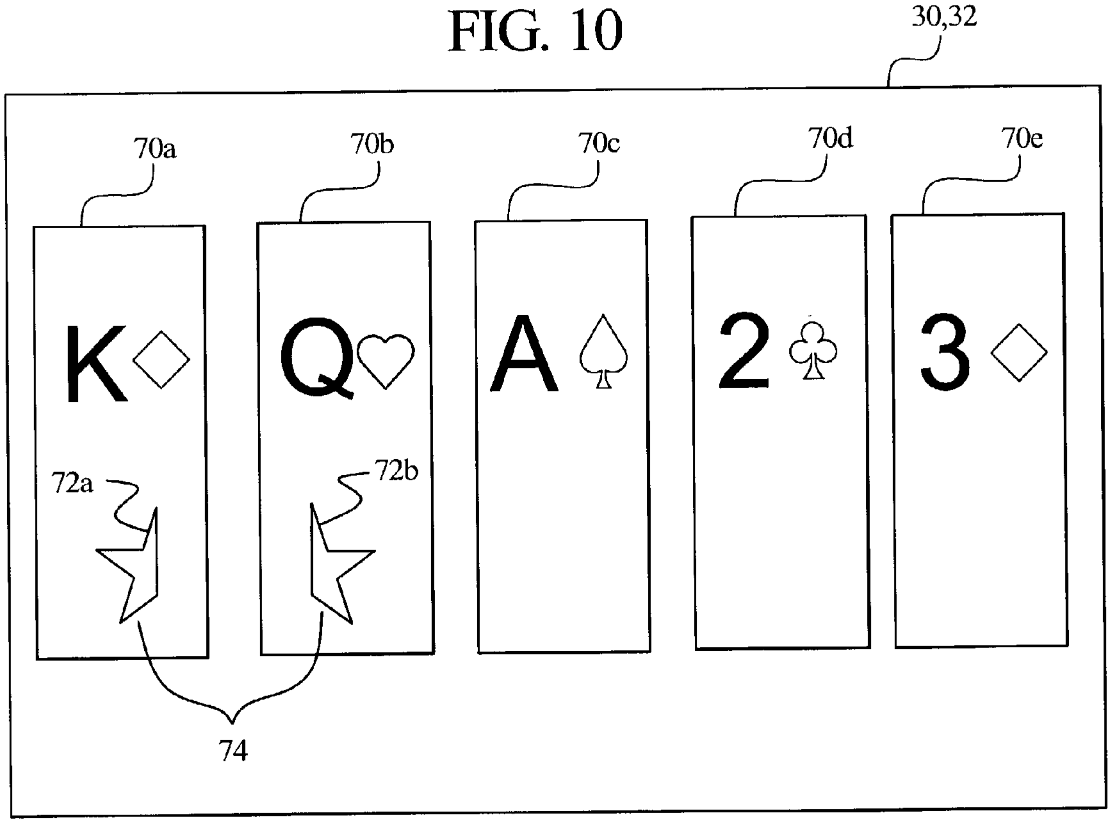
FIG. 10 is a front plan view of a display device displaying a set of cards including a resultant wild symbol.
Figure 11:
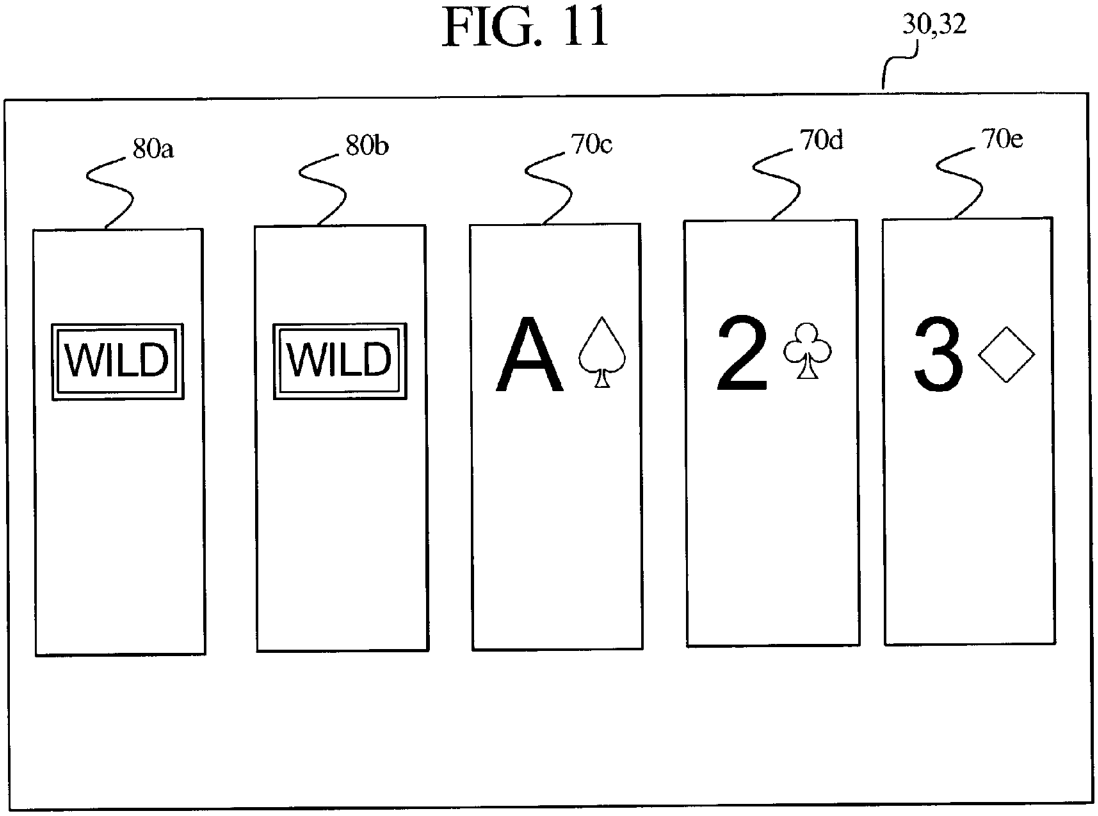
FIG. 11 is a front plan view of a display device displaying a set of cards in which certain cards become wild cards.

In one alternative embodiment, the resultant wild symbols are displayed within a display device on a set of cards such as in a video poker game. The resultant wild symbols include complimentary wild symbols displayed on separate cards. For example, a player uses the control features of the gaming device to have the processor deal a set of cards 70*a* through 70*e*, as illustrated in FIG. 10. The first card 70*a* includes a complimentary wild symbol 72*a* in the form of a left half of a star. The second card 70*b* includes a complimentary wild symbol 72*b* in the form of a right half of a star. The processor combines the complimentary wild symbols to create a resultant wild symbol 74. For one embodiment, the processor transforms the first and second cards into wild cards 80*a* and 80*b*, respectively, as illustrated in FIG. 11. These cards substitute for any other cards used in the game. In another embodiment, the processor transforms one of such cards into a wild symbol. In another embodiment, the processor sequentially transforms each card into wild symbol and makes a determination of any winning hand after each transformation. In another embodiment, the resultant wild symbol is an extra wild symbol used with the other displayed cards.

Figure 12:
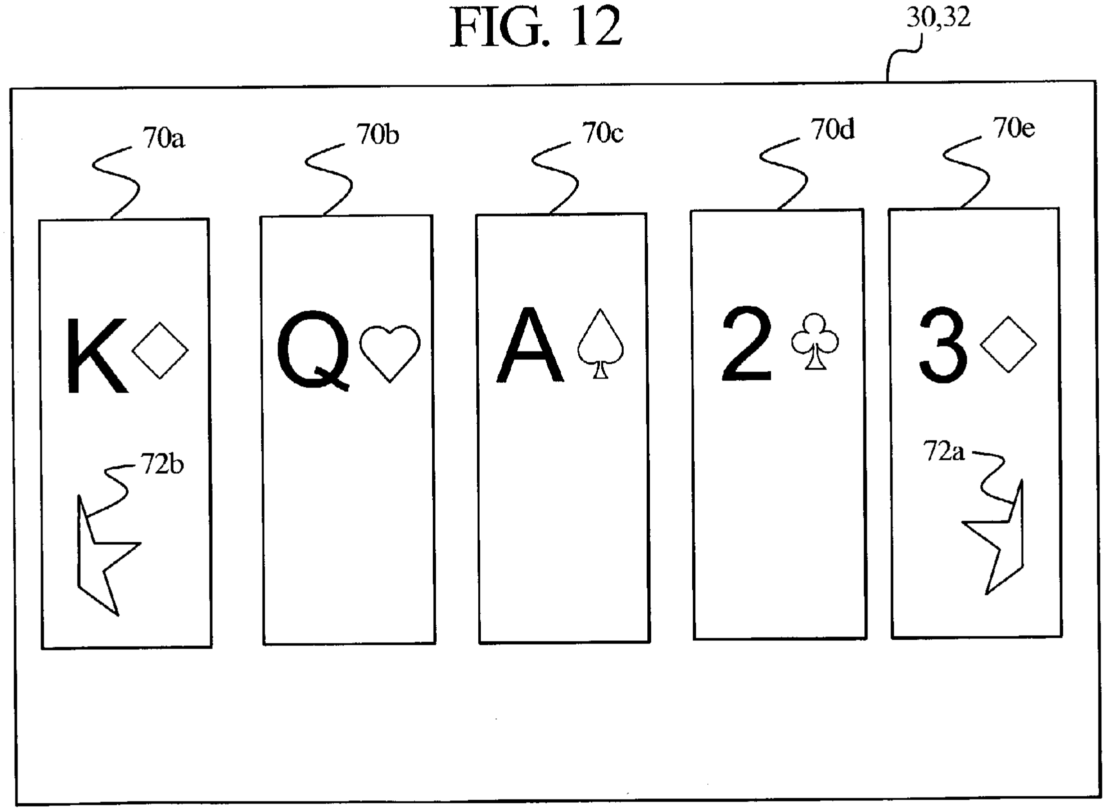
FIG. 12 is a front plan view of a display device displaying a set of cards including a resultant wild symbol.
Figure 13:
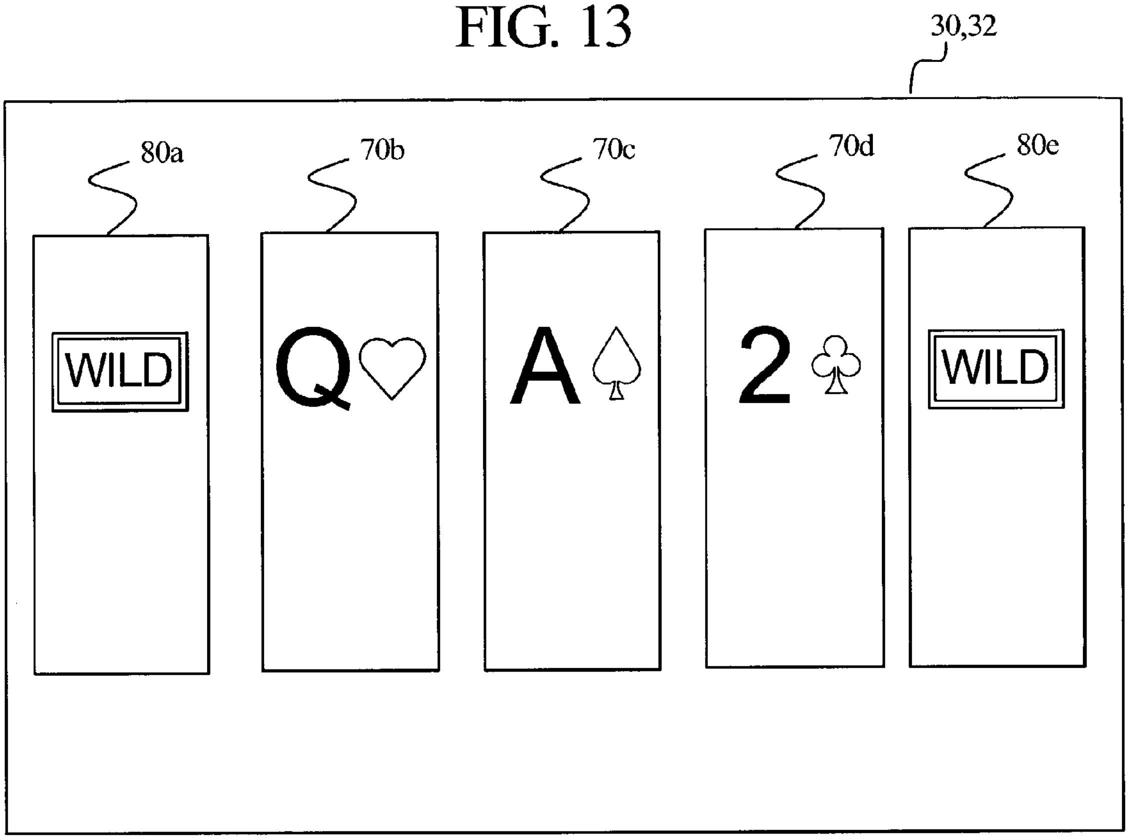
FIG. 13 is a front plan view of a display device displaying a set of cards in which certain cards become wild cards.

In another embodiment, a resultant wild symbol is formed from the combination of complimentary wild symbols on related but non-adjacent cards. In one example, five cards 70*a* through 70*e* are displayed within a display device as illustrated in FIG. 12. The first and fifth cards have complimentary wild symbols 72*b* and 72*a*, respectively. The processor combines the complimentary wild symbols to create a resultant wild symbol. In one embodiment, the processor transforms the first and fifth cards 70*a* and 70*e* into wild cards 80*a* and 80*e*, respectively, as illustrated in FIG. 13. It is appreciated that this type of combination of complimentary wild symbols is not limited to embodiments having five cards and can include any plurality of cards. It should also be appreciated that alternative suitable wild card transformations as described above may be preformed by the processor.

Figure 14:
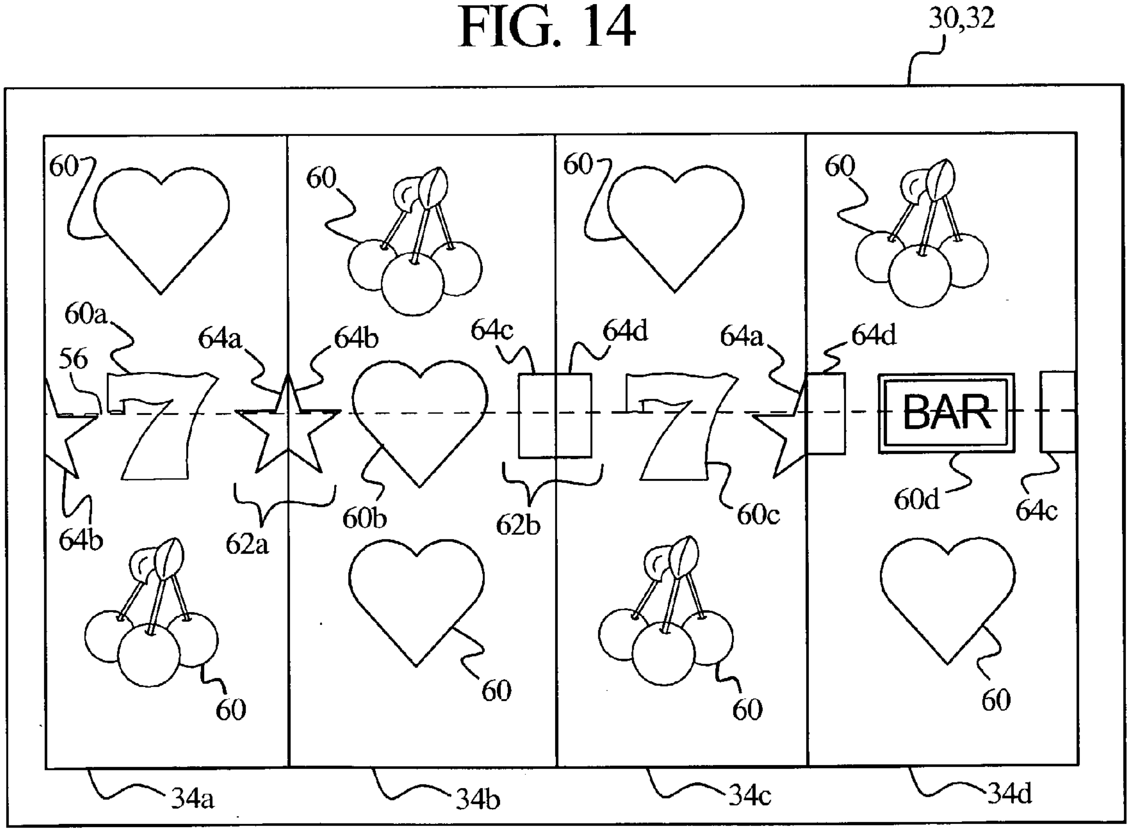
FIG. 14 is a front plan view of a display device displaying a set of reels including a plurality of resultant symbols.

The resultant wild symbols can function as wild symbols either simultaneously or successively. In one example, a display device displays four reels, as illustrated in FIG. 14. The first reel 34*a* includes along payline 56 a complimentary wild symbol 64*b* in the form of a right half of a star, a "7" symbol 60*a* and another complimentary symbol 64*a* in the form of a left half of a star. The second reel 34*b* includes along payline 56 a complimentary wild symbol 64*b* in the form of a right half of a star, a heart symbol 60*b* and a complimentary symbol 64*c* in the form of a left half of a square. The third reel 34*c* includes along payline 56 a complimentary wild symbol 64*d* in the form of a right half of a square, the "7" symbol 60*c* and another complimentary wild symbol 64*a* in the form of a left half of a star. The fourth reel 34*d* includes along payline 56 complimentary wild symbol 64*d* in the form of a right half of a square, a "BAR" symbol 60*d*, and a complimentary wild symbol 64*c* in the form of a left half of a square.

Figure 15:
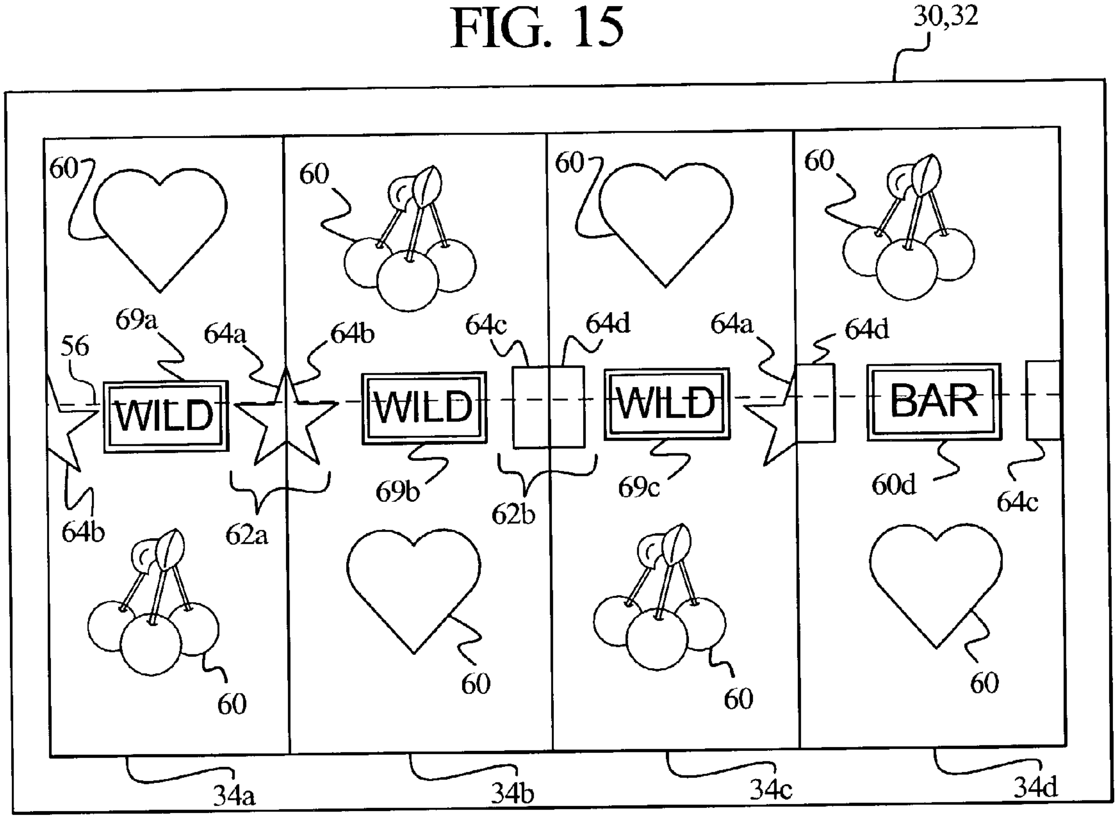
FIG. 15 is a front plan view of a display device displaying a set of reels in which certain symbols become wild.

In this example, the processor combines complimentary wild symbols 64*a* and 64*b* to create resultant wild symbol 62*a*. In addition, the processor combines complimentary wild symbols 64*c* and 64*d* to create resultant wild symbol 62*b*. If the processor transforms the symbols along the payline 56 adjacent to the resultant wild symbols into wild symbols 69*a*, 69*b* and 69*c* simultaneously, as illustrated in FIG. 15, the player receives four "BAR" symbols.

Figure 16A:
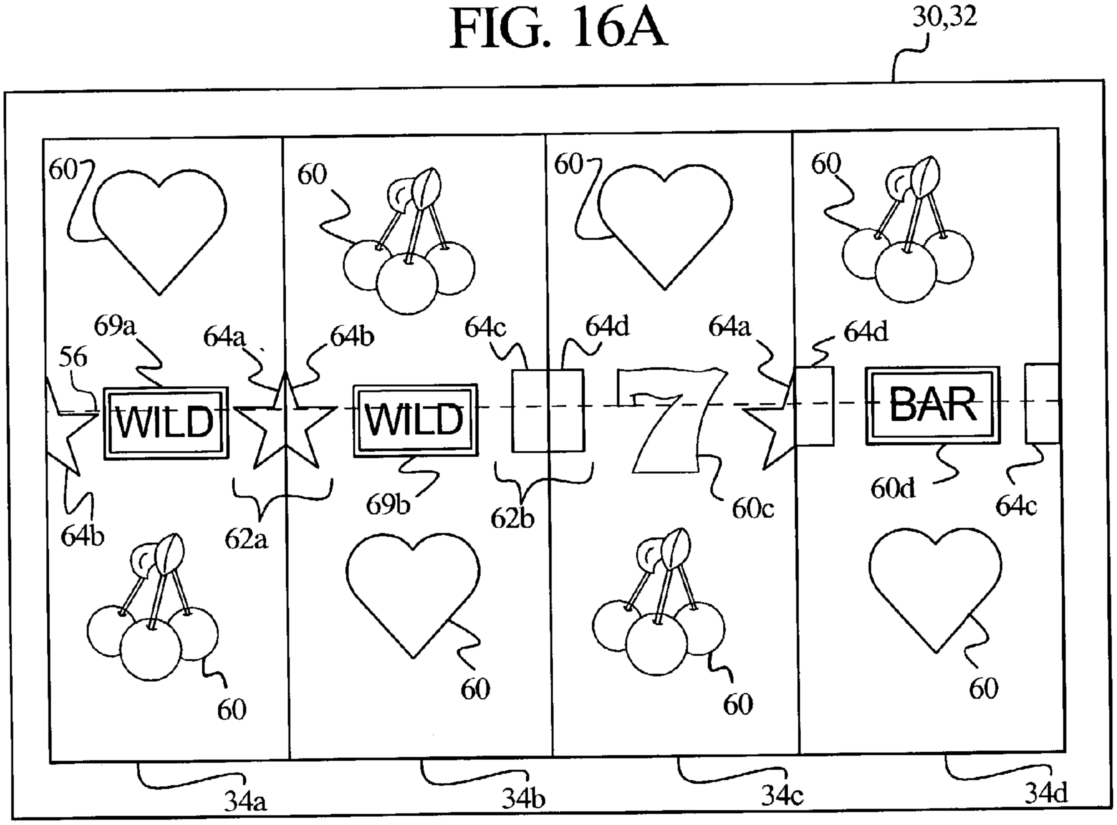
FIGS. 16A and 16B are front plan views of a display device displaying a set of reels in which certain symbols on the reels become wild.
Figure 16B:
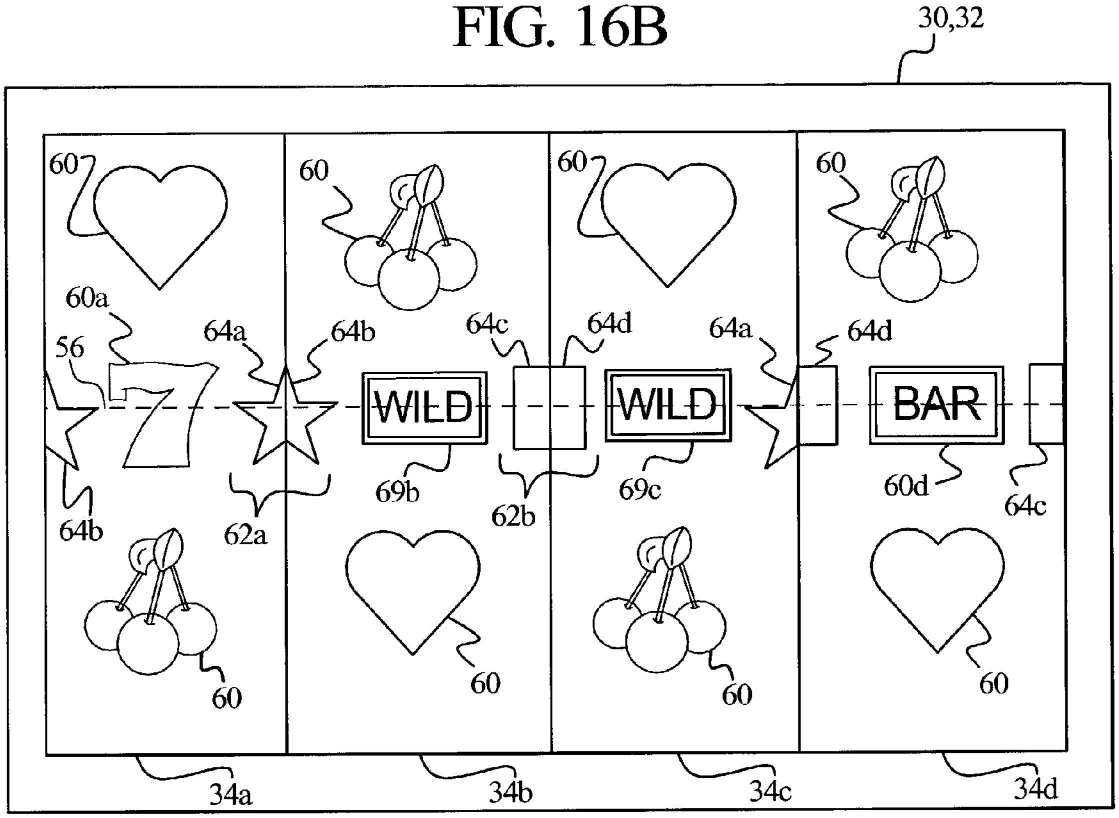

However, if the processor transforms the symbols adjacent to the resultant wild symbols into wild symbols successively, as illustrated in FIGS. 16A and 16B, then the player obtains a first combination of three "7" symbols or three "BAR" symbols. Next, the second resultant wild symbol causes the adjacent symbols to become wild. The player receives three "7" symbols or three "BAR" symbols a second time.

Figure 17:
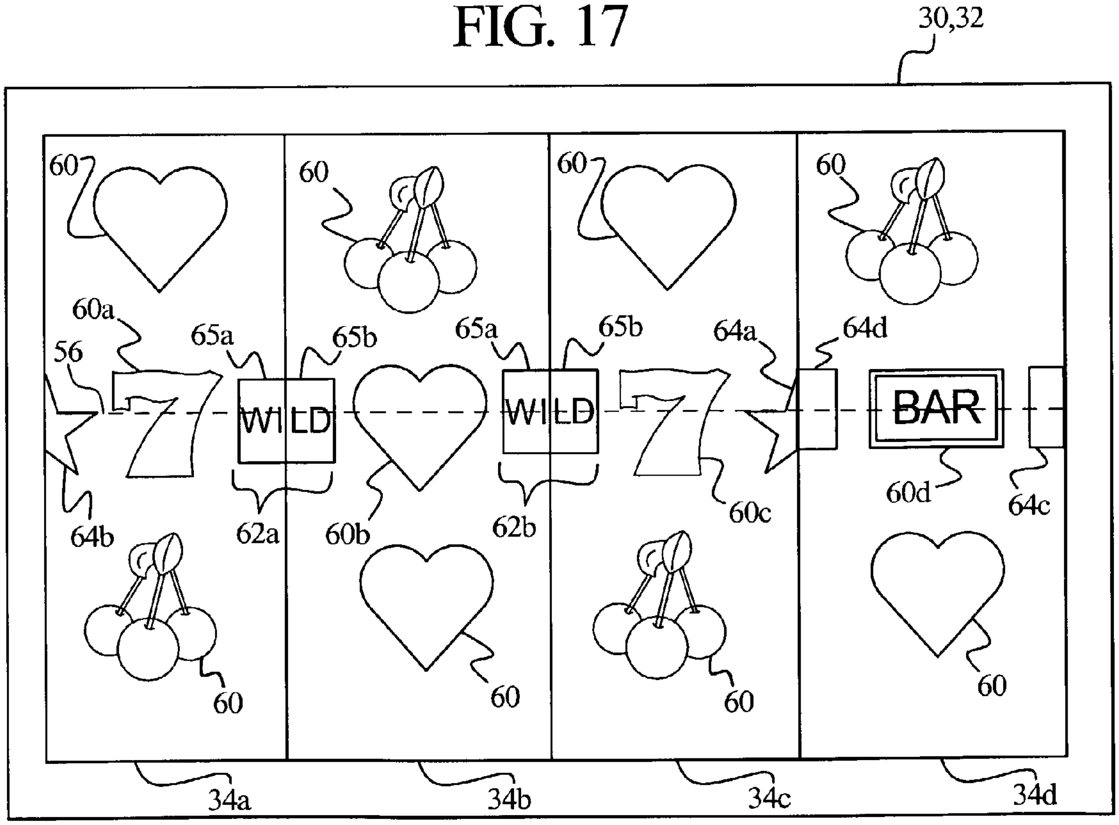
FIG. 17 is a front plan view of a display device displaying a set of reels including a plurality of resultant wild symbols which become wild.
Figure 18A:
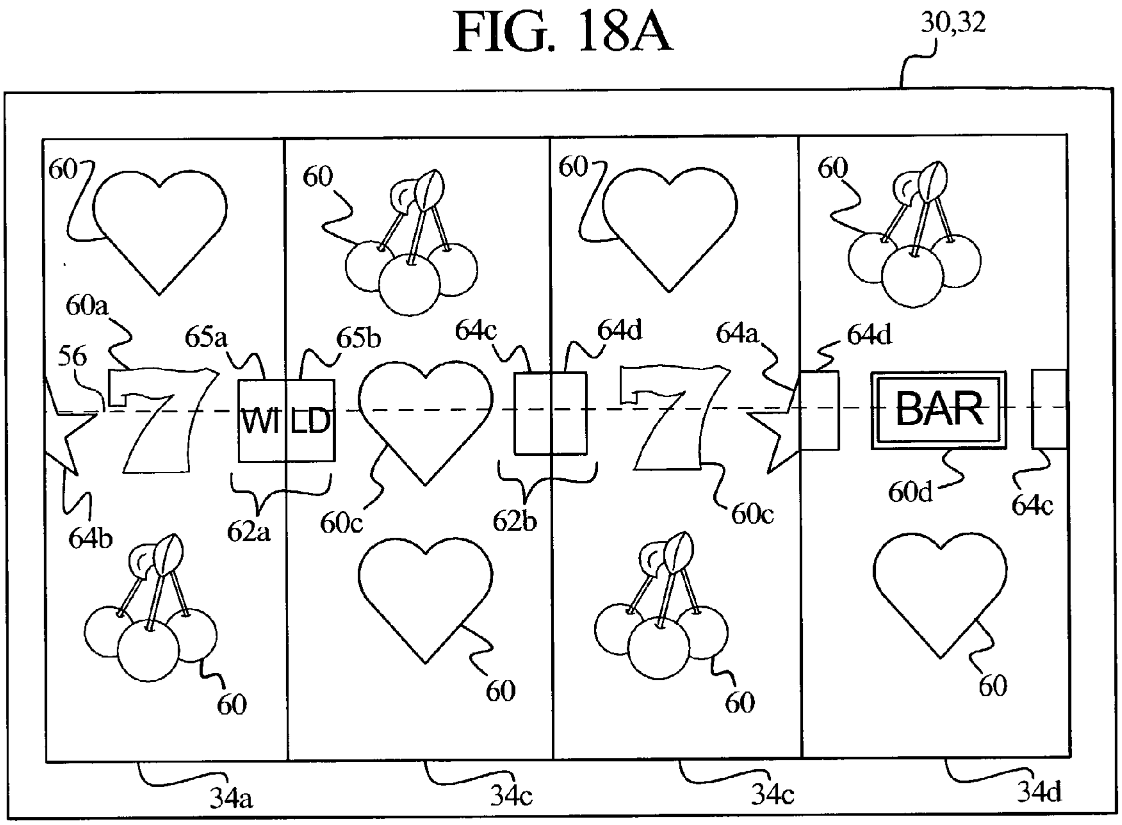
FIGS. 18A and 18B are front plan views of a display device displaying a set of reels including a plurality of resultant symbols which become wild successively.
Figure 18B:
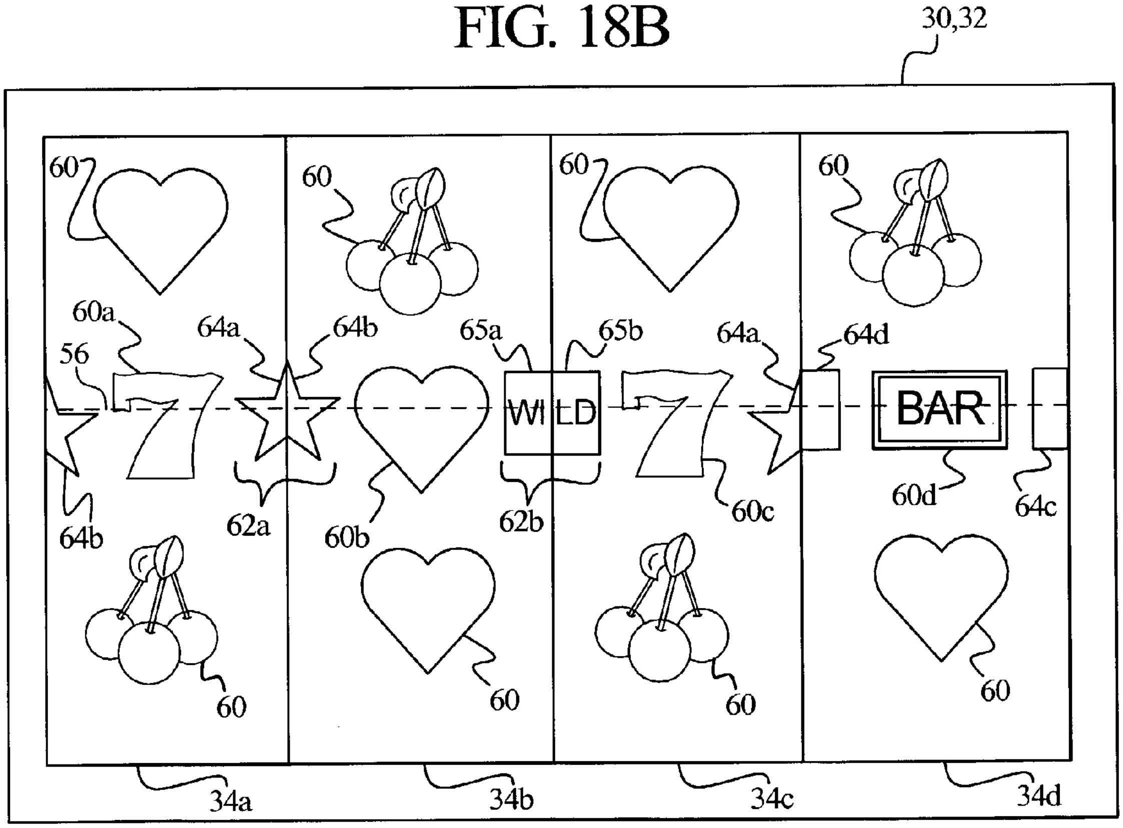

If the processor transforms the resultant wild symbols 62*a* and 62*b* into wild symbols, the player obtains four "7" symbols, as illustrated in FIG. 17. If the processor transforms the resultant wild symbols 62*a* and 62*b* into wild symbols successively, as illustrated in FIGS. 18A and 18B, the player first receives a combination of three "7" symbols. Next, the processor combines complimentary wild symbols 64*c* and 64*d* to create a resultant wild symbol 62*b*. The player again obtains three "7" symbols.

Figure 19A:
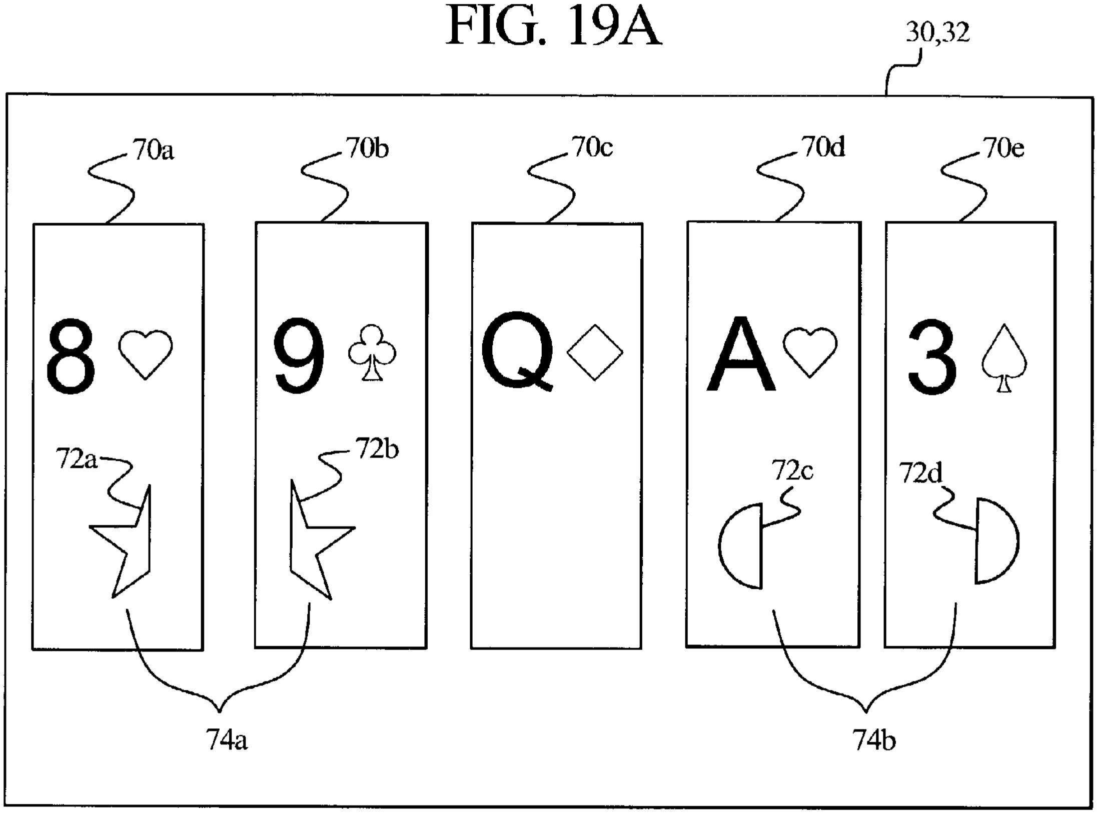
FIGS. 19A and 19B are front plan views of a display device displaying a set of cards including a plurality of resultant symbols.

In one alternative embodiment, a plurality of resultant wild symbols 74*a* and 74*b* are included on a set of five cards 70*a* through 70*e* displayed in a video poker game, as shown in FIG. 19A. The resultant wild symbols are included on the first and second cards 70*a* and 70*b* as well as the fourth and fifth cards 70*d* and 70*e*. The processor transforms the cards into wild cards simultaneously, successively, or in any combination thereof.

Figure 19B:
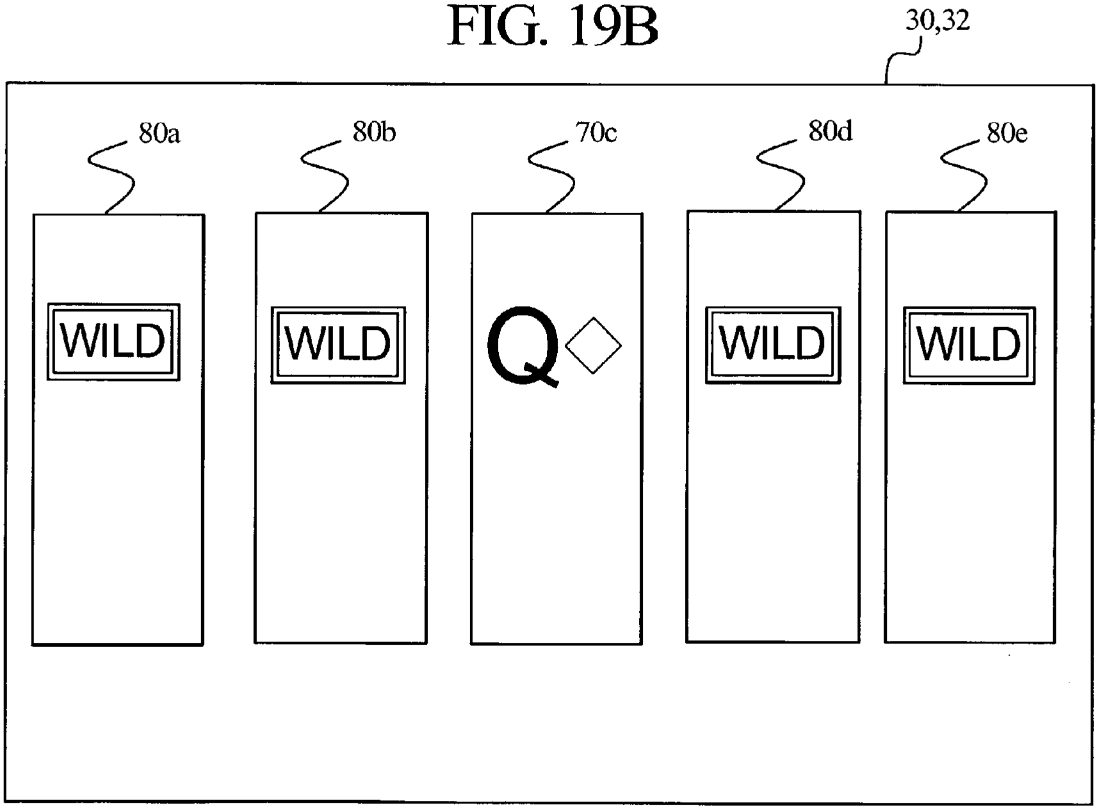
Figure 20A:
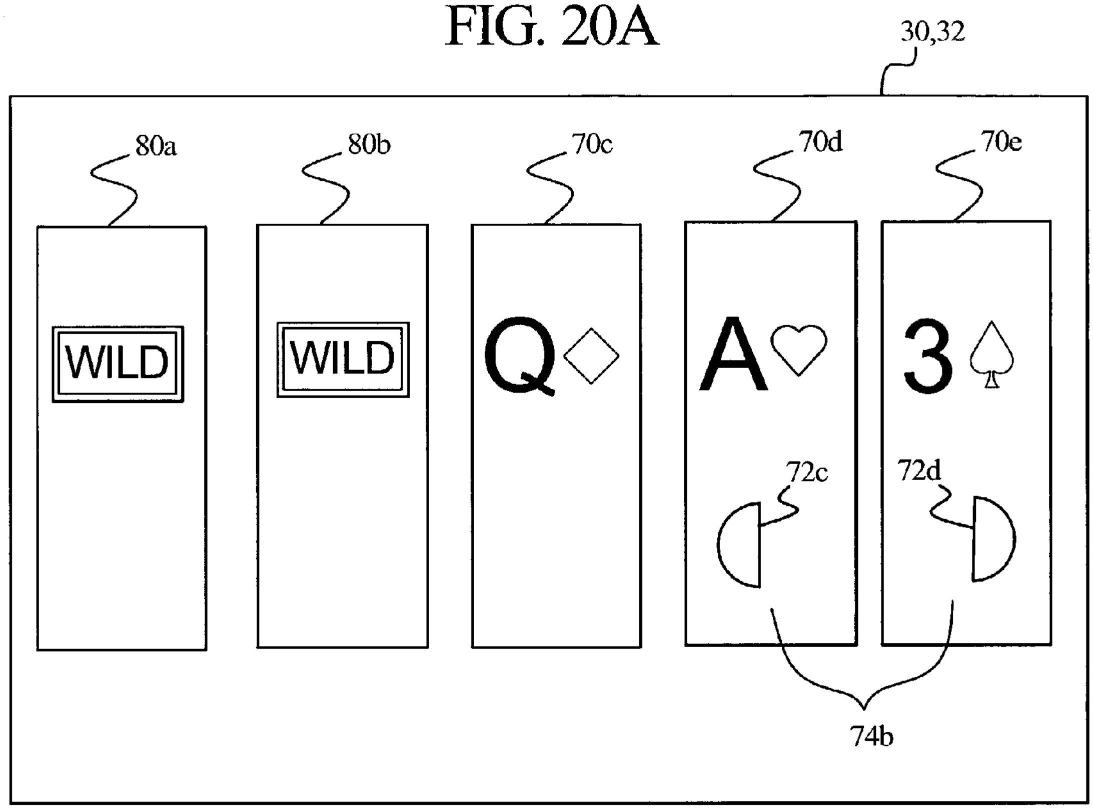
FIGS. 20A and 20B are front plan views of a display device displaying a set of cards including a plurality of resultant symbols which become wild successively.
Figure 20B:
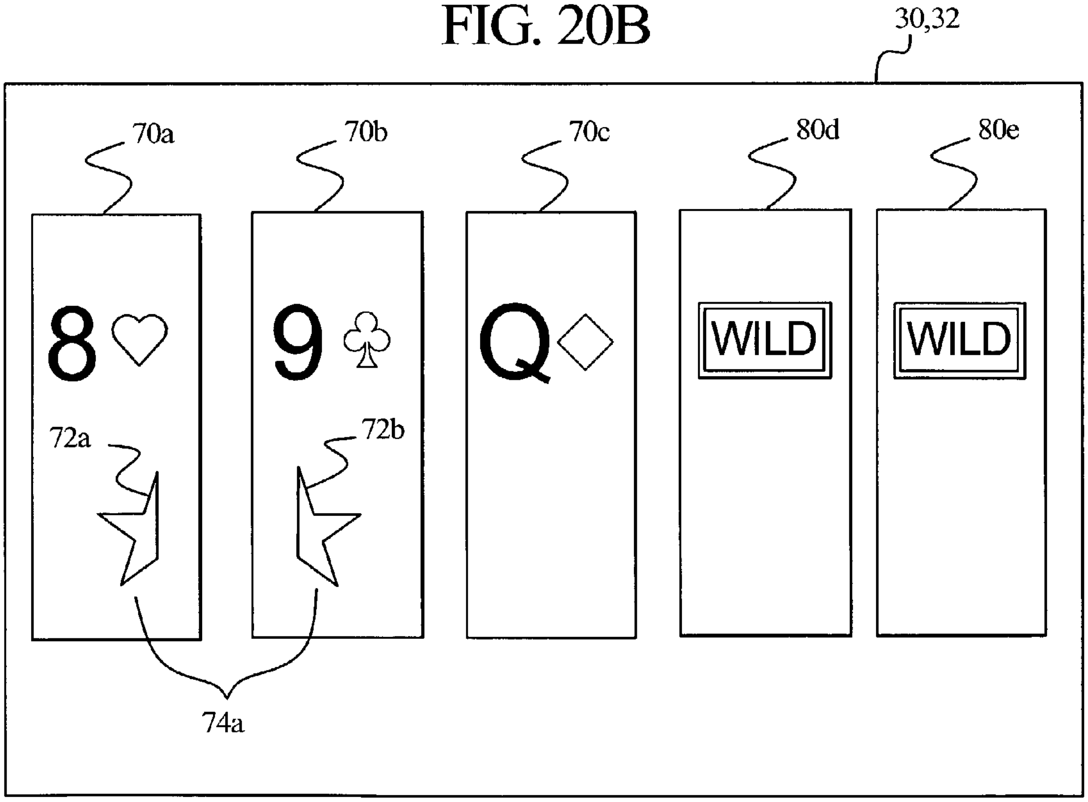

If the cards including the resultant wild symbols are transformed into wild cards 80*a*, 80*b*, 80*d* and 80*e* simultaneously, as illustrated in FIG. 19B, the player receives five Queens. If the cards including the resultant wild symbols are transformed successively, the first and second cards 70*a* and 70*b* are transformed into wild cards 80*a* and 80*b*, respectively, as illustrated in FIG. 20A. The player receives three Aces. Next, the fourth and fifth cards 70*d* and 70*e* are transformed into wild cards 80*d* and 80*e*, as illustrated in FIG. 20B. The player then receives a straight.

Other alternative embodiments are illustrated in FIGS. 21 to 25. In these embodiments, the resultant wild symbol 62 extends or transforms one or more symbols on the reels, either horizontally, vertically and in any combination desired by the game implementor.

Figure 21A:
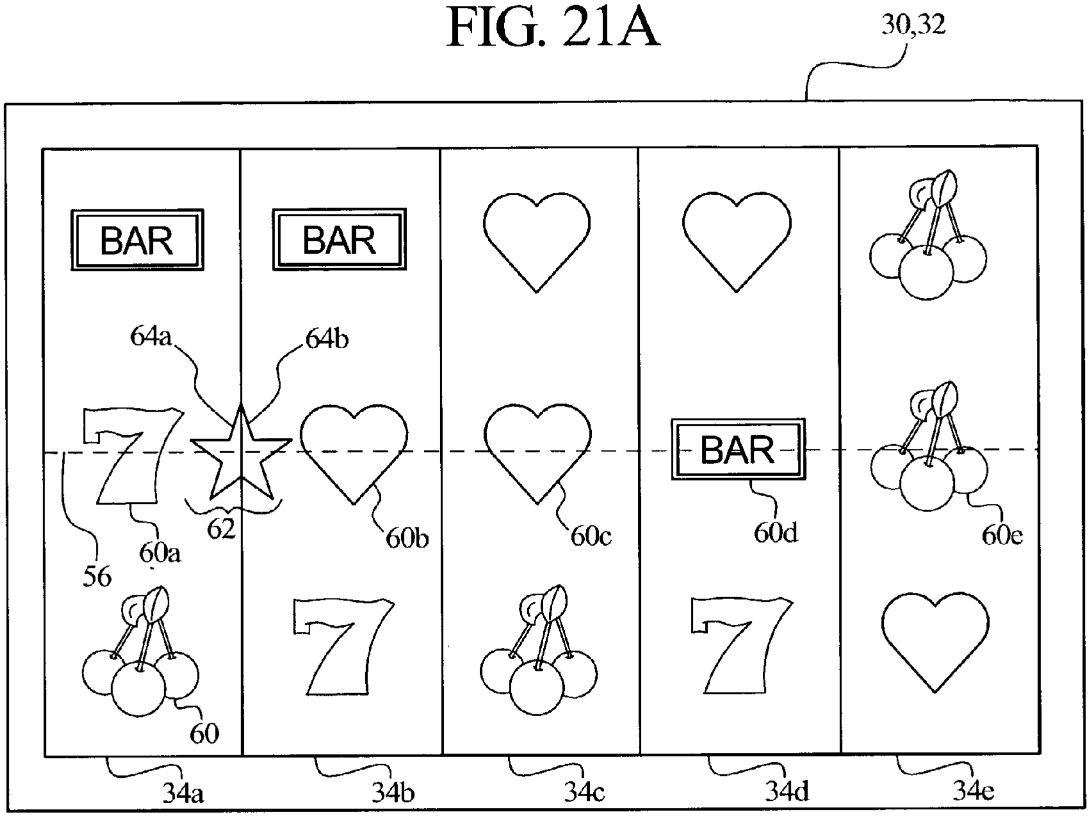
FIGS. 21A and 21B are front plan views of a display device displaying a set of reels in which a resultant wild symbol transforms the symbol on the right of the resultant wild symbol into the symbol on the left of the resultant wild symbol.
Figure 21B:
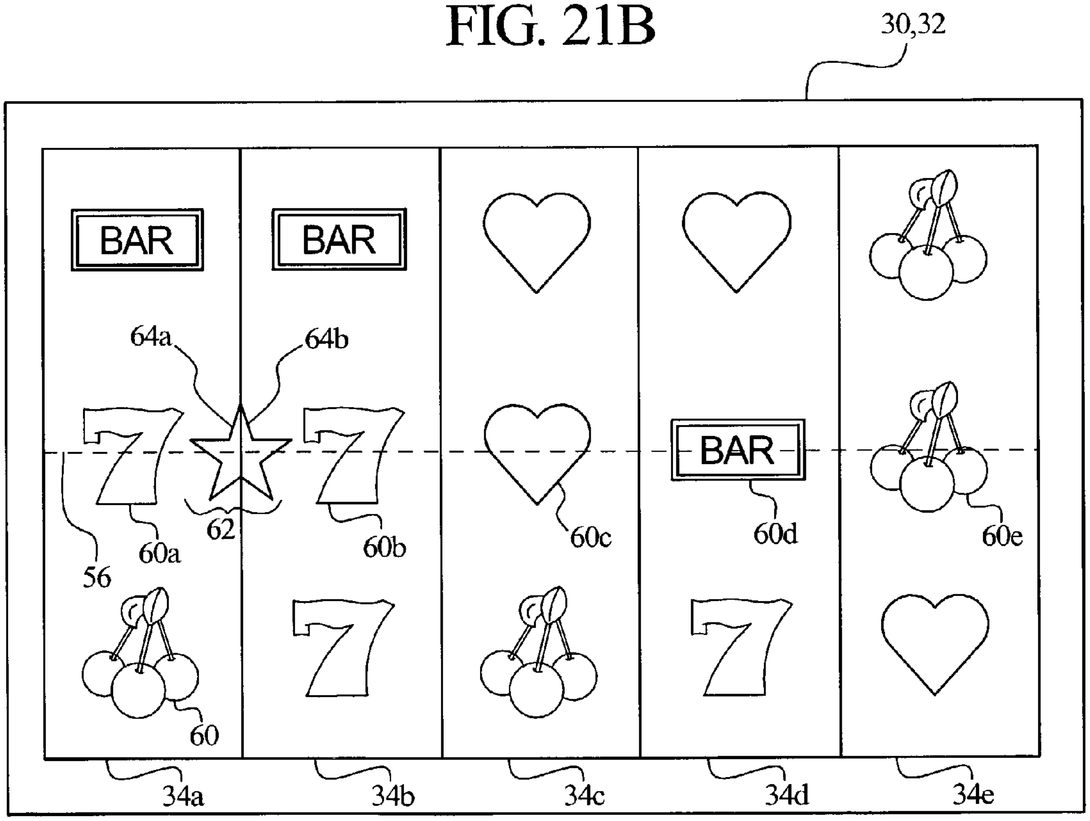

Referring now specifically to FIG. 21*a*, a resultant wild symbol 62 is formed from a complimentary wild symbol 64*a* which is in the form of a left side of a star and complimentary symbol 64*b* which is in the form of a right side of a star. In one embodiment, the resultant wild symbol 62 extends one or more symbols horizontally across the reels. The resultant wild symbol may extend a symbol across any number of reels such as one reel, two reels or all of the reels. As illustrated in FIG. 21*b*, the resultant wild symbol 62 extends the "7" symbol 60*a* to the second reel 34*b*. The resultant wild symbol 62 may extend a symbol and/or it may act as a substitute or wild symbol. In FIG. 21*b*, the resultant wild symbol 62 performs both functions by acting like a wild symbol and forms a three "7" symbols on payline 56. It should be appreciated that the resultant wild symbol 62 may extend a symbol that is adjacent to it, diagonal to it, or in any other related position or randomly picked position on the reels as desired by the game implementor. It should also be appreciated that the resultant wild symbol 62 may extend a symbol across one or more reels 34 (i.e., skipping or not skipping certain symbols or symbol positions). A resultant wild symbol can also extend a symbol across a predetermined number of reels or a random number of reels. Accordingly, it should be appreciated that the resultant wild symbol can also function as an extender symbol.

Figure 22A:
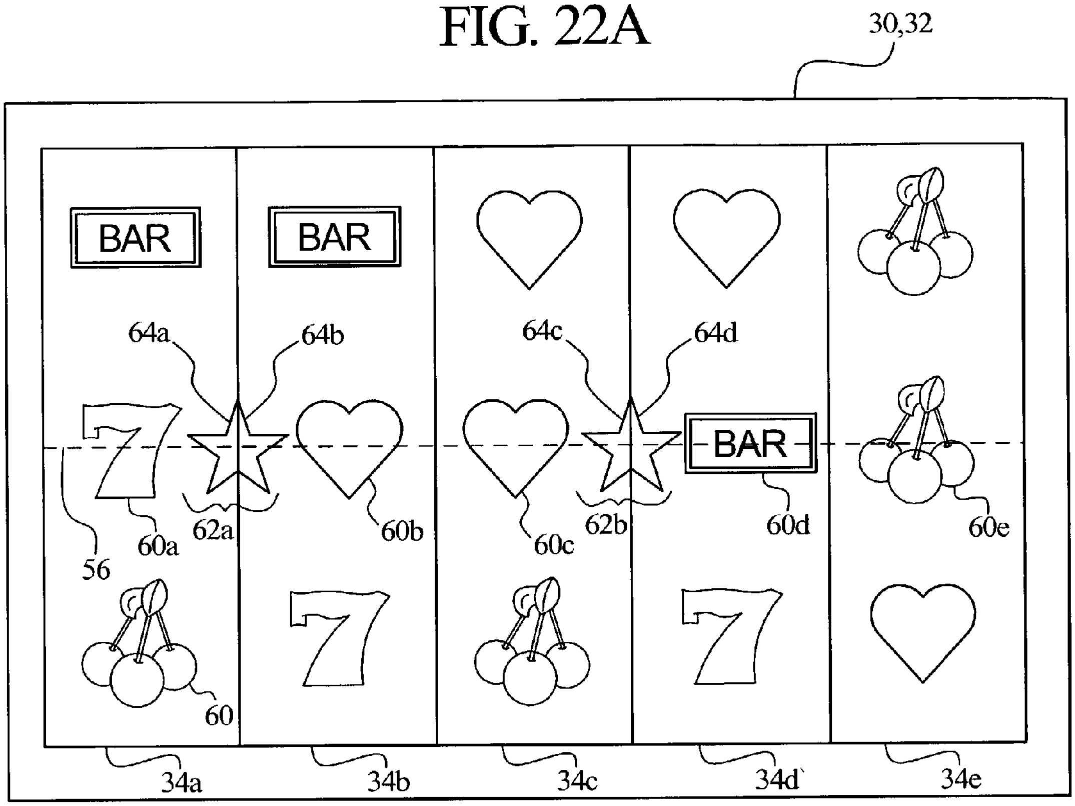
FIGS. 22A and 22B are front plan views of a display device displaying a set of reels in which resultant wild symbols transform the symbols that are adjacent to the resultant wild symbols.
Figure 22B:
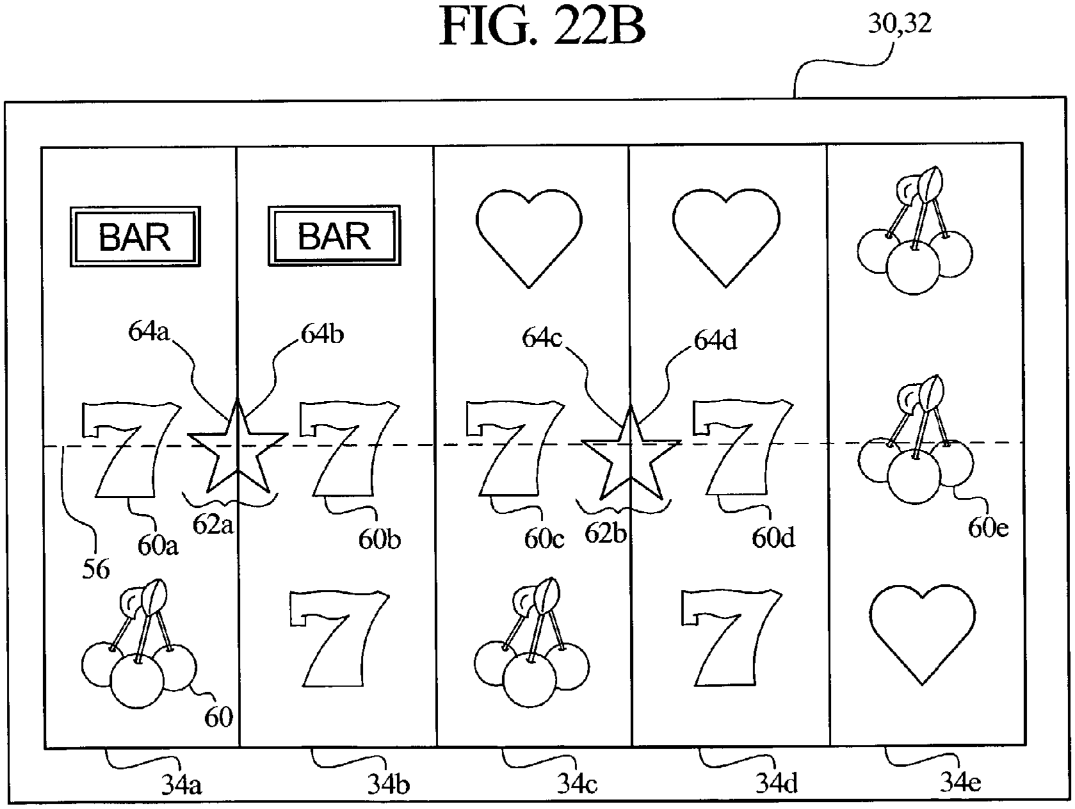

Referring now to FIGS. 22*a* and 22*b*, two resultant wild symbols 62*a* and 62*b* are formed on the reels by complimentary symbols 64*a* and 64*b*, and 64*c* and 64*d*, respectively. A first resultant wild symbol 62*a* is formed from a left side of a star 64*a* and a right side of a star 64*b*. The resultant wild symbol 62*b* is formed from a left side of a star 64*c* and a right side of star 64*d*. In this alternative embodiment, the "7" symbol 60*a* on the left side of the resultant wild symbol 62*a* is extended across the reels to those reels that are adjacent to a resultant wild symbol 62*a* and 62*b*. As illustrated in FIG. 22*b*, the "7" symbol 60*a* is extended across reels 34*a*, 34*b*, 34*c* and 34*d*. Note that the cherry symbol 60*e* is not transformed into a "7" symbol because the cherry symbol 60*a* was not adjacent to one of the resultant wild symbols 62*a* or 62*b*. The final symbol combination is four "7" symbols 60*a*, 60*b*, 60*c* and 60*d* in a row. In another embodiment, the resultant wild symbols 62*a* and 62*b* also functions like a wild symbol and are substituted for the symbol that is extended across the reels. In this case, the symbol combination includes six "7" symbols aligned across the reels.

Figure 23A:
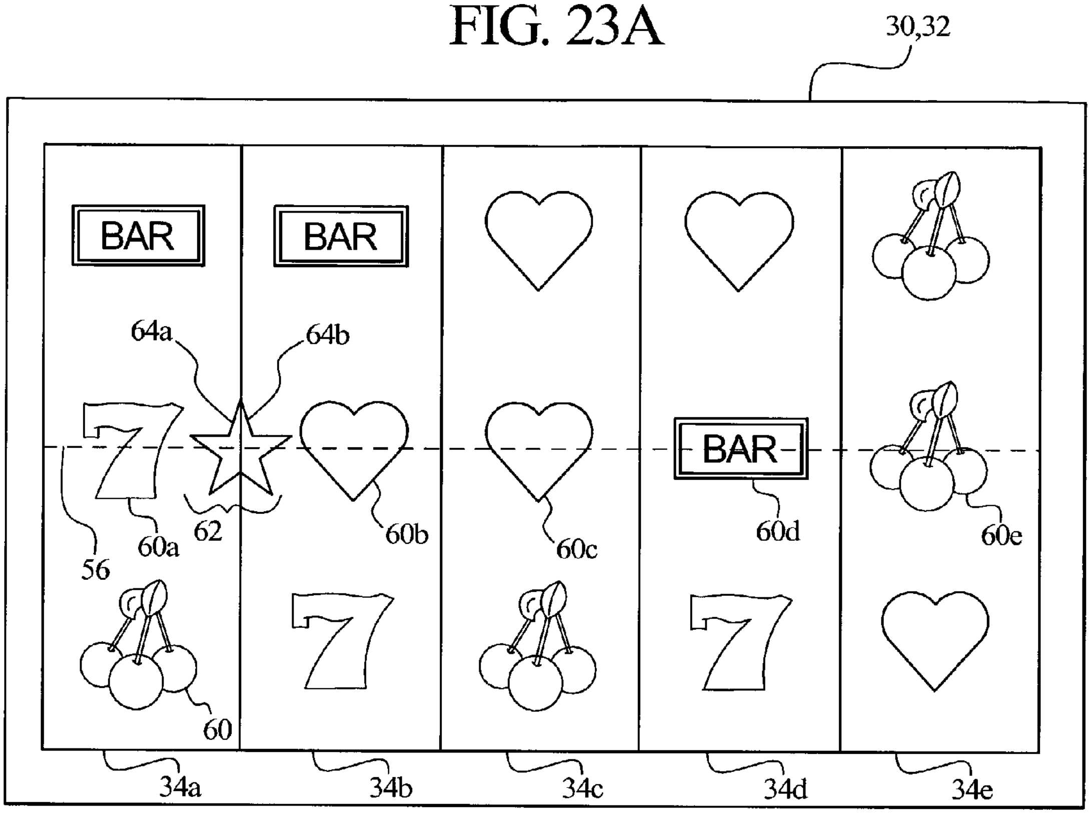
FIGS. 23A and 23B are front plan views of a display device displaying a set of reels in which a resultant wild symbol transforms all of the symbols on the same payline as the resultant wild symbol.
Figure 23B:
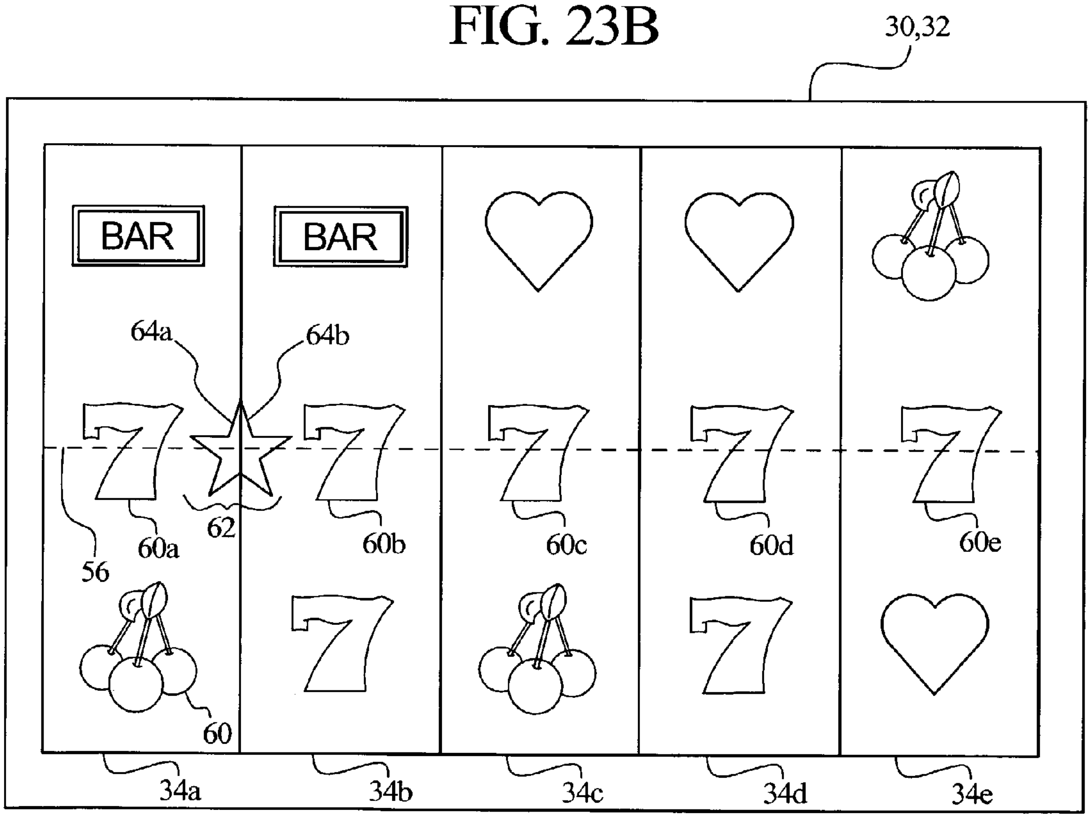

In another alternative embodiment illustrated in FIGS. 23*a* and 23*b*, the resultant wild symbol 62 extends a symbol across a predetermined number of reels. In this embodiment, the resultant wild symbol 62 is formed from the left side of a star 64*a* and from the right side of a star 64*b*. A resultant wild symbol extends the symbol to the left of the resultant wild symbol 62, which is the "7" symbol 60*a*, across a predetermined number of reels. In this case, the resultant wild symbol 62 extends the "7" symbol 60*a* across all of the reels 34. As shown in FIG. 23*b*, the "7" symbol 60*a* is extended across or to reels 34*b*, 34*c*, 34*d* and 34*e*. The final symbol combination becomes five "7" symbols on the payline 56. In another embodiment, the resultant wild symbol 62 acts like a wild symbol and is substituted with the "7" symbol 60*a* . Thus, the final symbol combination is six "7" symbols across payline 56. It should be appreciated that the resultant wild symbol 62 may extend a symbol across a predetermined or random number of reels.

Figure 24A:
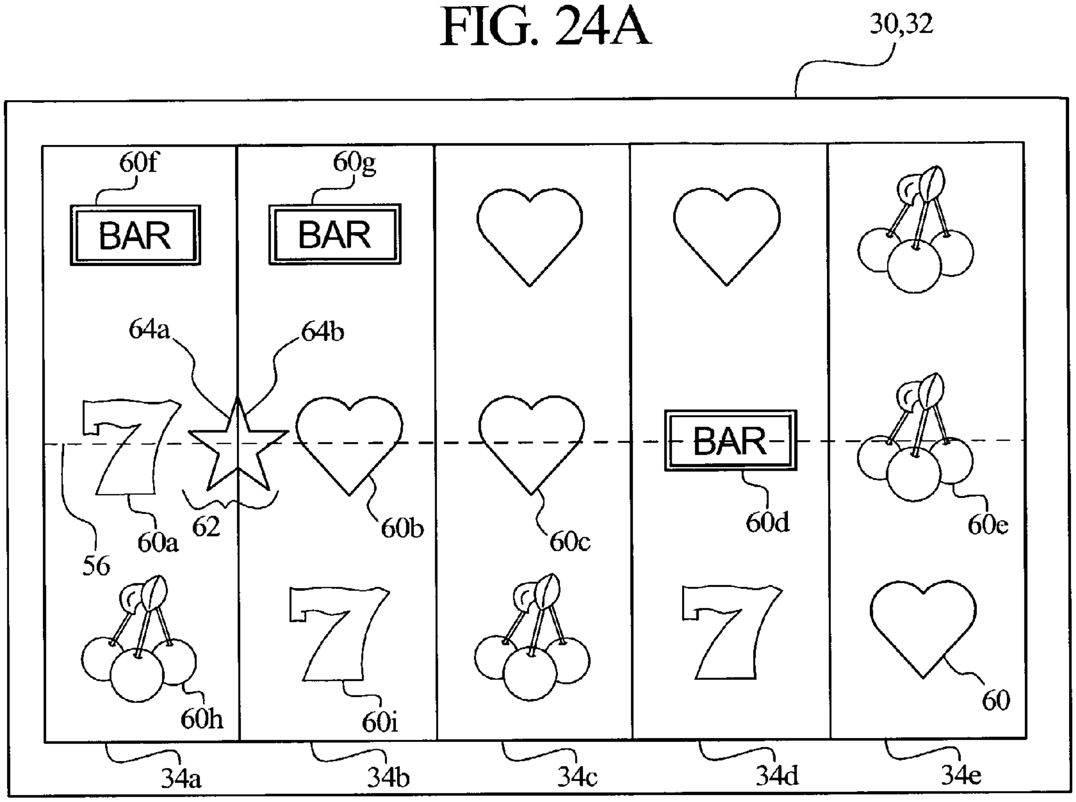
FIGS. 24A and 24B are front plan views of a display device displaying a set of reels in which a resultant wild symbol transforms all of the symbols on the reels that are adjacent to the resultant wild symbol.
Figure 24B:
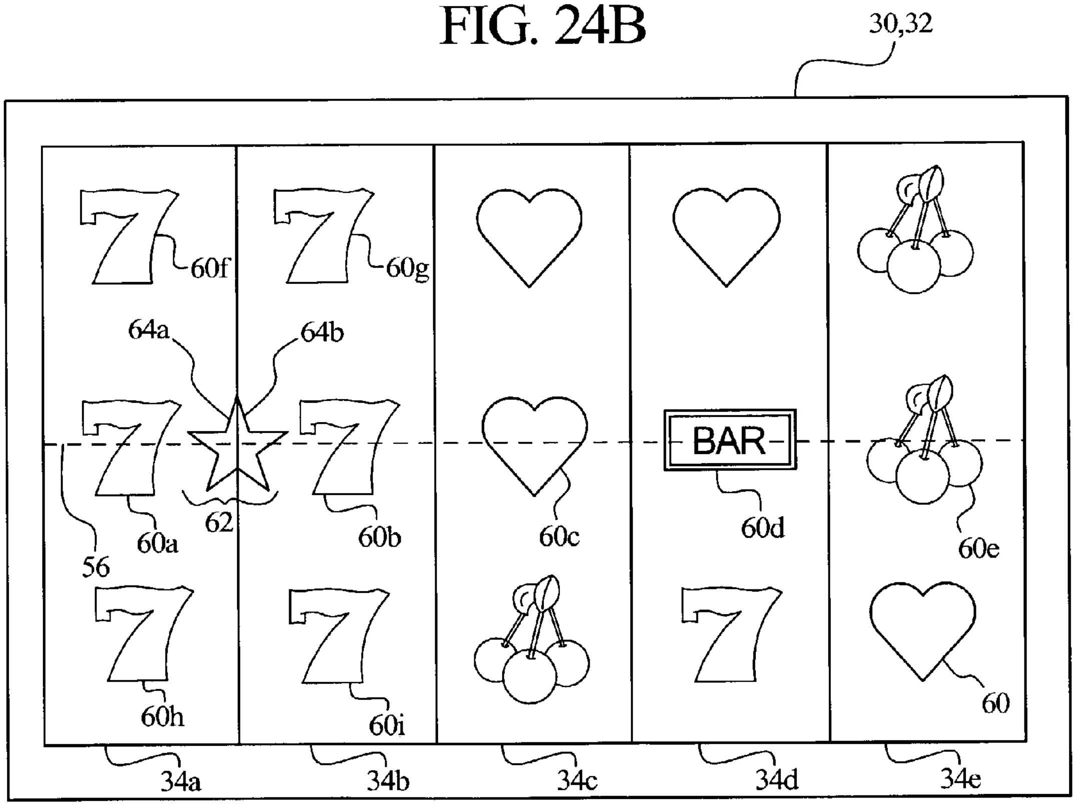

Referring now to FIGS. 24*a* and 24*b*, the resultant wild symbol 62 extends the symbols that are vertically adjacent to the resultant wild symbol on the reels. In this example, there are five reels 34*a* to 34*e* and a resultant wild symbol 62 is formed from a two complimentary wild symbols 64*a* and 64*b*. The resultant wild symbol 62 is a star which is formed from a left side of a star 64*a* on reel 34*a* and from a right side of a star 64*b* on reel 34*b*. As illustrated in FIG. 24*b*, the resultant wild symbol 62 extends the adjacent "7" symbol 60*a* to the adjacent reel 34*b* and thereby transforms the heart symbol 60*b* shown in FIG. 24*a* to a "7" symbol 60*b* in FIG. 24*b*. Then, the "7" symbol 60*a* and 60*b* are extended vertically on reels 34*a* and 34*b*. The "BAR" symbols 60*f* and 60*g* and the cherry symbol 60*h* are transformed into the "7" symbol. As shown in FIG. 24*b*, all of the symbols on reels 34*a* and 34*b* have been transformed into "7" symbols as a result of the resultant wild symbol 62.

In this example, the resultant combination on payline 56 does not provide a winning combination of three or more symbols unless the resultant wild symbol 62 acts like a wild symbol. If the resultant wild symbol acts as a wild symbol, the resultant wild symbol 62 forms the combination of three "7" symbols on the payline 56. In another embodiment, the processor employs a scatter pay combination where any three symbols across the paylines provides a winning combination. Therefore, any of the three "7" symbols on reels 34*a* and 34*b* provides a winning combination. It should be appreciated that vertically extending one or more symbols on the reels may create a winning combination of symbols or may eliminate a winning combination of symbols, depending on which symbol or symbols are being extended on the reels.

In an alternative embodiment, the extender symbol only extends a symbol on the reels to improve the award or payout to the player in a particular activation of the reels. If an award is eliminated, decreased or remains the same based on the extension of a symbol on the reels by the extender symbol, the symbol is not extended on the reels. For example in a particular game, the extender symbol extends a symbol across one reel and also acts as a wild symbol. In addition, three "BAR" symbols provide a larger award to the player than three cherry symbols in the game. The player activates the reels and obtains a cherry symbol, an extender symbol, and three "BAR" symbols on a payline associated with the reels. If the cherry symbol is extended by the extender symbol, there will be three cherry symbols instead of three "BAR" symbols indicated on the payline, which decreases the award in that activation. Therefore, the extender symbol does not extend the cherry symbol across the reels because extending the cherry symbol decreases the award provided to the player.

Figure 25A:
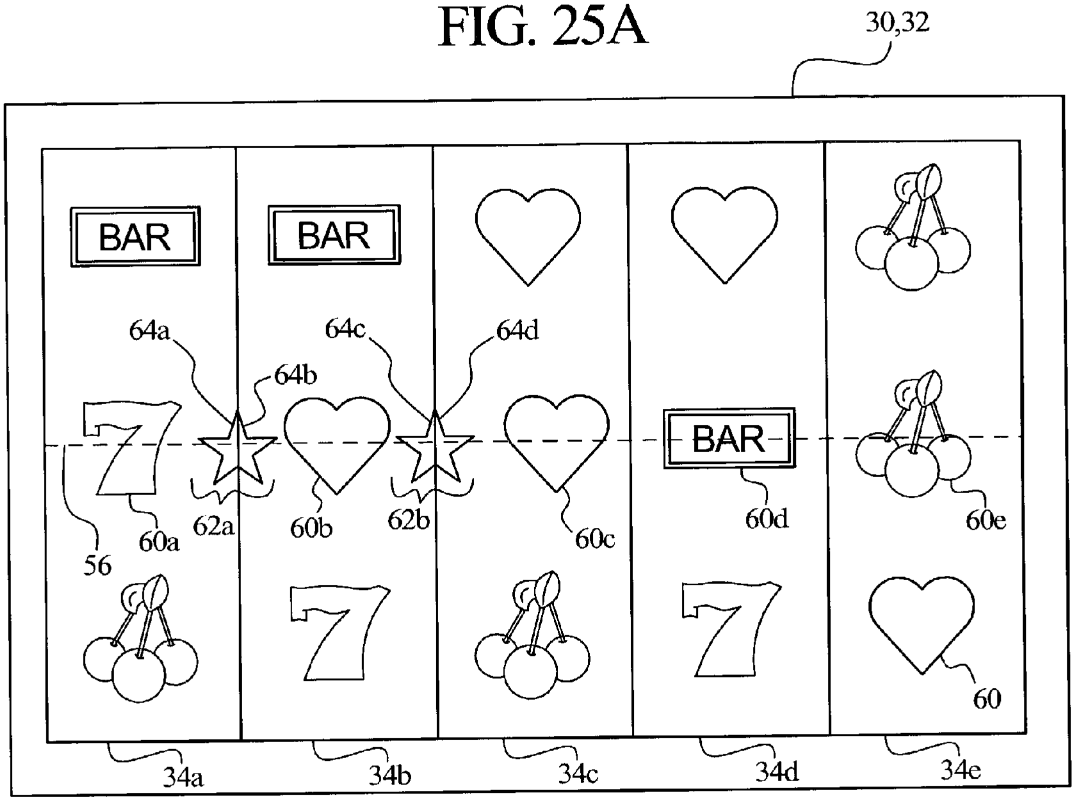
FIGS. 25A and 25B are front plan views of a display device displaying a set of reels in which resultant wild symbols transform and upgrade the symbols that are adjacent to the resultant wild symbols.
Figure 25B:
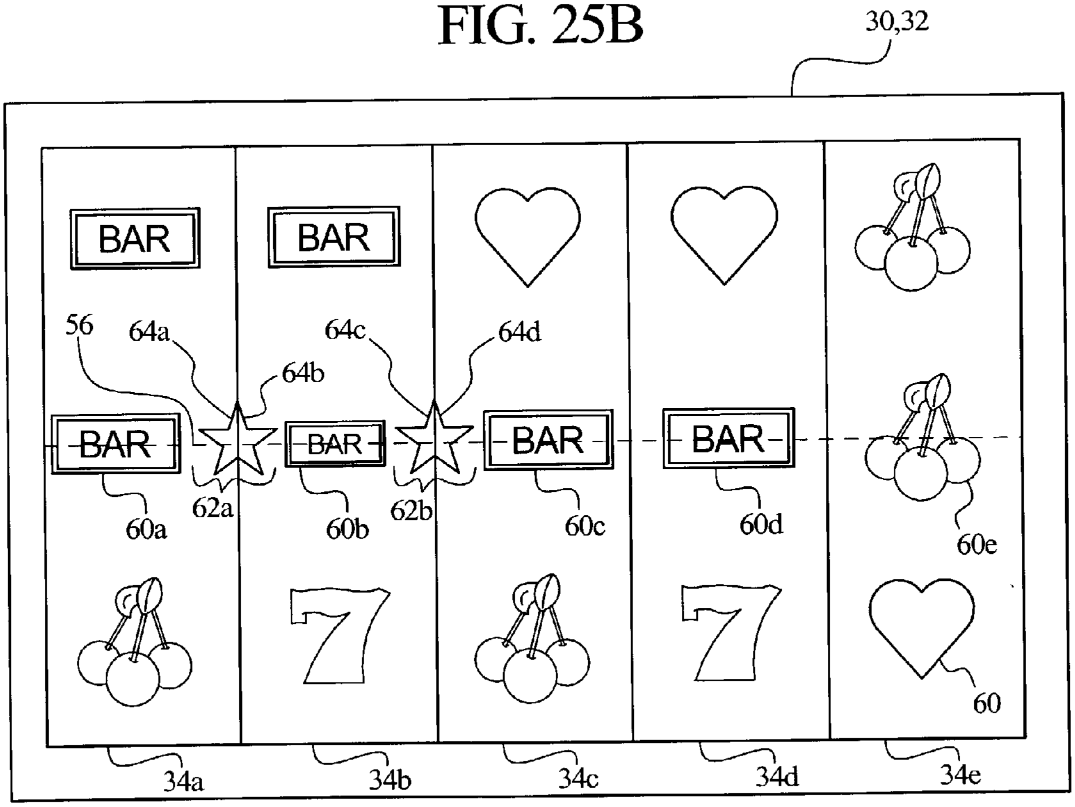

Referring now to FIGS. 25*a* and 25*b*, another alternative embodiment is shown where the resultant wild symbols 62*a* and 62*b* are adjacent to each other on payline 56. In this embodiment, when one or more resultant wild symbols 62 are formed by two complimentary wild symbols and are adjacent to each other on the reels 34, the symbols adjacent to the resultant wild symbol 62 are upgraded to the highest symbol on the reels. In this example, the highest or most valuable symbol is the "BAR" symbol 60*d*. Therefore, the symbols adjacent to the resultant wild symbols 62*a* and 62*b*, which in this case are symbols 60*a*, 60*b* and 60*c*, are upgraded to the "BAR" symbol. The resultant winning combination on payline 56 is four "BAR" symbols or six "BAR" symbols if the resultant wild symbols 62*a* and 62*b* act as wild symbols. The adjacent resultant wild symbols 62*a* and 62*b* may also provide one or more multipliers to the player, which multiplies the award for the winning combination by a predetermined or random amount or value. Also, the adjacent resultant wild symbols may extend the symbols across the reels horizontally or vertically or perform any other function desired by the game implementor. It should also be appreciated that the resultant wild symbol 62 in this alternative embodiment may act as a wild symbol and thereby substitute for or transform into a symbol on the reels or simply extend one or more symbols on the reels.

Referring to FIGS. 26A, 26B, 26C and 26D, in a further alternative embodiment of the present invention, the gaming device includes at least one extender symbol on the reels. In one embodiment, the extender symbol horizontally extends one of the symbols, which is adjacent to the extender symbol on the reels, to one or more other reels. It should be appreciated that the extender symbol may extend one or more symbols across the reels. It should also be appreciated that the extender symbol may extend a symbol horizontally, vertically, diagonally or in any manner desired by the game implementor.

Figure 26A:
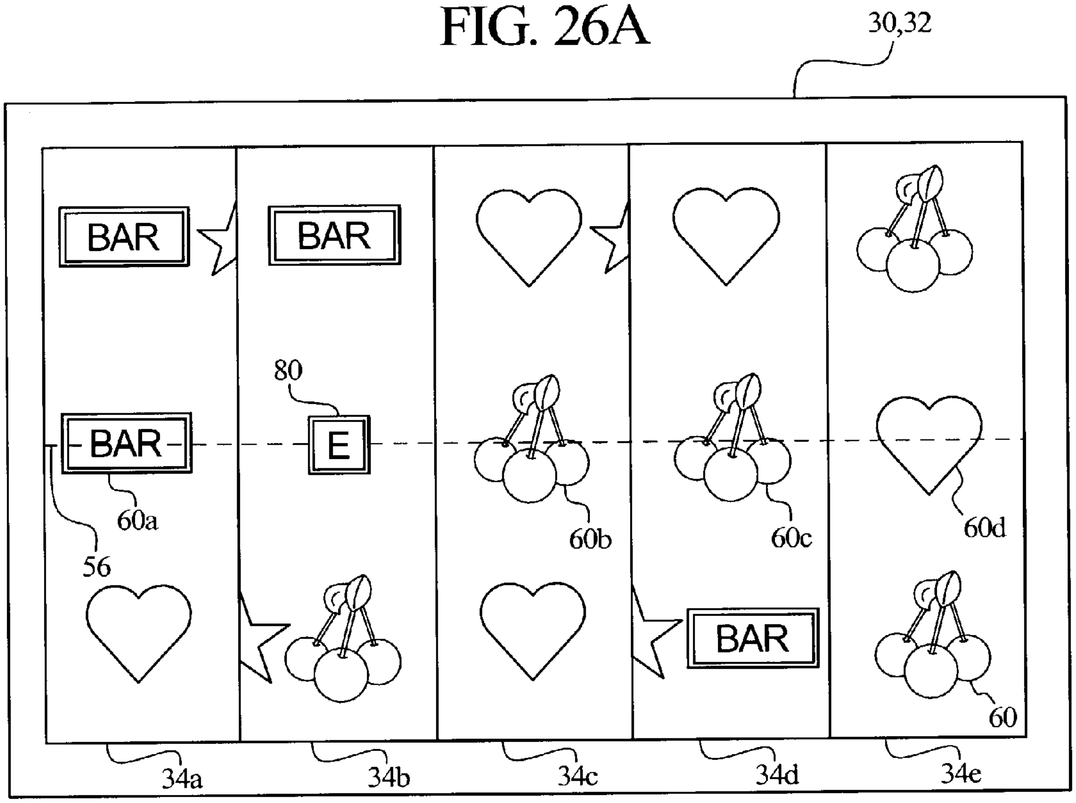
FIGS. 26A and 26B are front plan views of a display device displaying a set of reels in which an extender symbol horizontally extends a symbol across the reels.
Figure 26B:
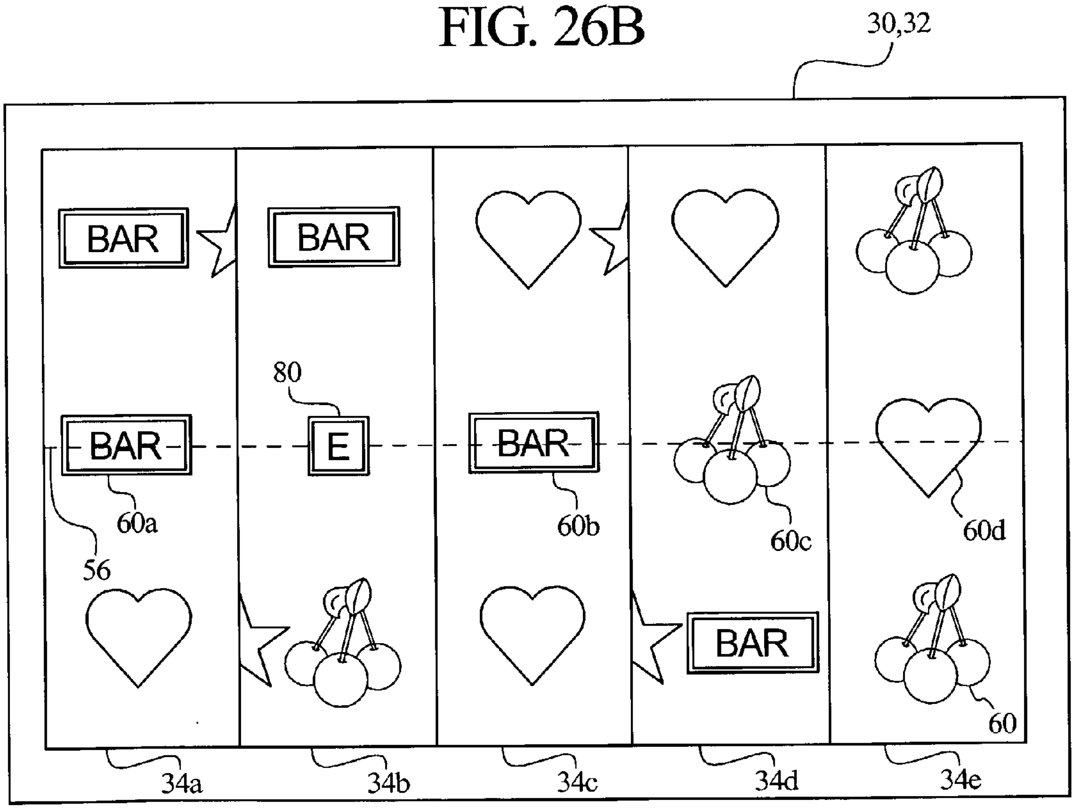

Referring to FIG. 26A, the gaming device displays five reels to the player having one payline 56. The player spins the reels. After the reels stop spinning, a "BAR" symbol 60*a*, an extender symbol 80, a cherry symbol 60*b*, a cherry symbol 60*c* and a heart symbol 60*d* occur on payline 56. In this example, the extender symbol 80 horizontally extends the bar symbol 60*a* from reel 34*a* to reel 34*c*. This transforms the cherry symbol 60*b* to a "BAR" symbol 60*b* as illustrated in FIG. 26B. In one embodiment, the extender symbol does not act as a wild symbol and therefore, there are only two "BAR" symbols 60*a* and 60*b* on payline 56. In another embodiment, the extender symbol acts as a wild symbol and as a result, there are three "BAR" symbols on payline 56. The player receives the award or awards associated with the resultant combination of symbols on the reels.

Figure 26C:
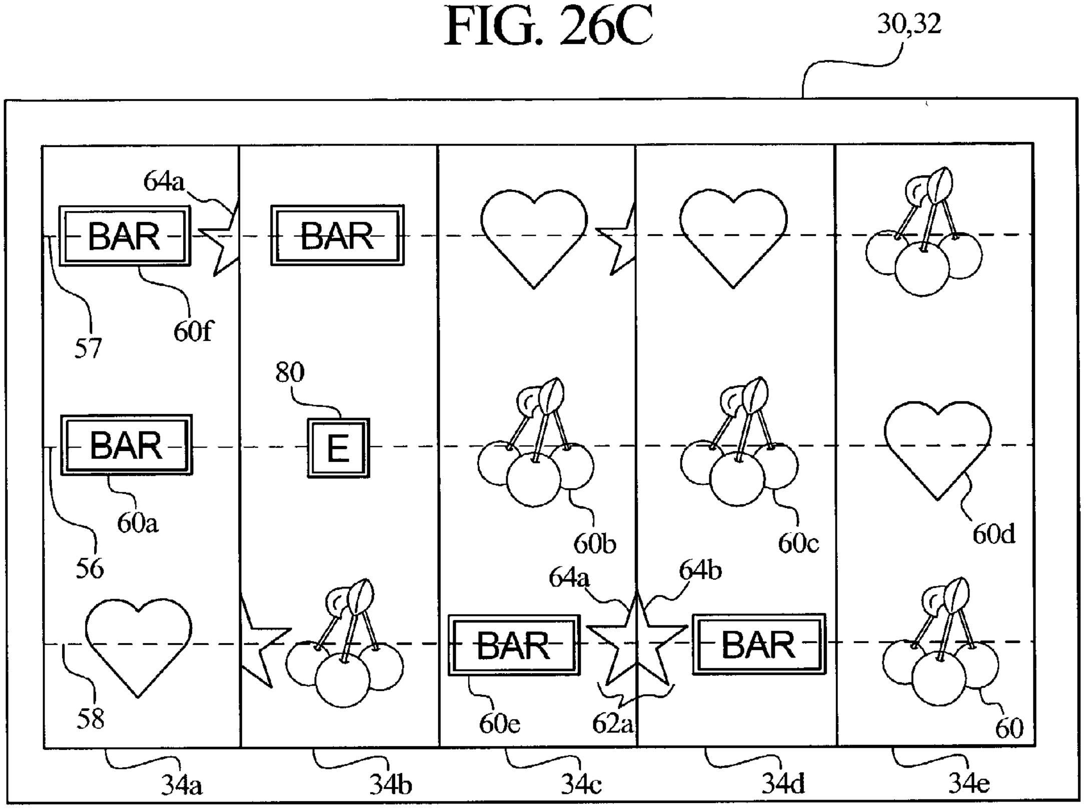
FIG. 26C is a front plan view of a display device displaying a set of reels in which an extender symbol diagonally extends two symbols across the reels.

Referring to FIG. 26C, another aspect of this embodiment is illustrated where the extender symbol 80 extends the adjacent symbols, bar symbol 60*e* and complimentary wild symbol 64*a* (which is in the form of the left side of a star), diagonally across the reels from reel 34*a* to reel 34*c*. As a result, the heart symbol at the bottom of the reel 34*c* (shown in FIG. 26B) transforms into the "BAR" symbol 60*e* and the complimentary wild symbol 64*a*. The extended complimentary wild symbol 64*a* combines with the complimentary wild symbol 64*b* (which is in the form of the right side of a star) on reel 34*d* to form resultant wild symbol 62*a*. As a result, three "BAR" symbols occur on the bottom payline 58. Therefore, the extender symbol can create additional winning combinations on the reels which adds excitement and enjoyment to the player.

Figure 26D:
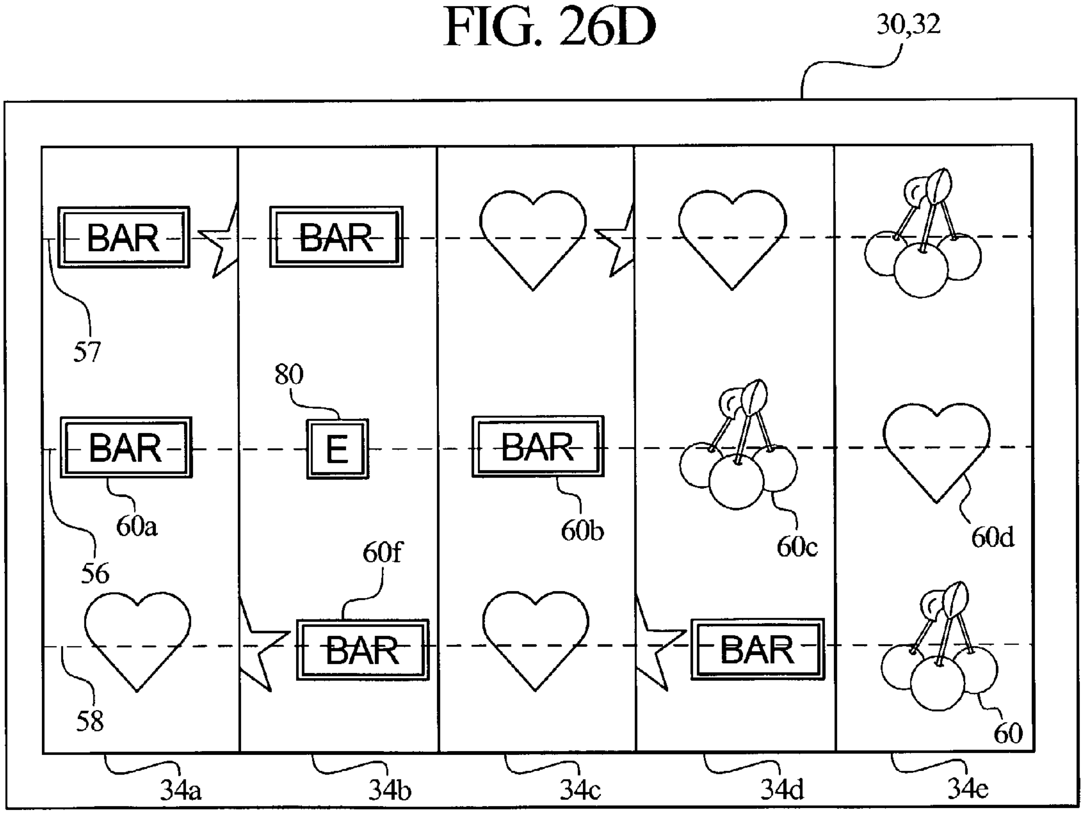
FIG. 26D is a front plan view of a display device displaying a set of reels in which an extender symbol vertically extends a symbol on a reel.

Referring to FIG. 26D, a further aspect of this embodiment is illustrated where the extender symbol 80 vertically extends bar symbol 60*e* on reel 34*b* from the top to the bottom of reel 34*b*. As a result, there are two bar symbols on reel 34*b*. It should be appreciated that the extender symbol may extend one or more symbols on the reels. Additionally, the extender symbol can extend a symbol across a predetermined number of reels or a random number of reels.

Figure 27A:
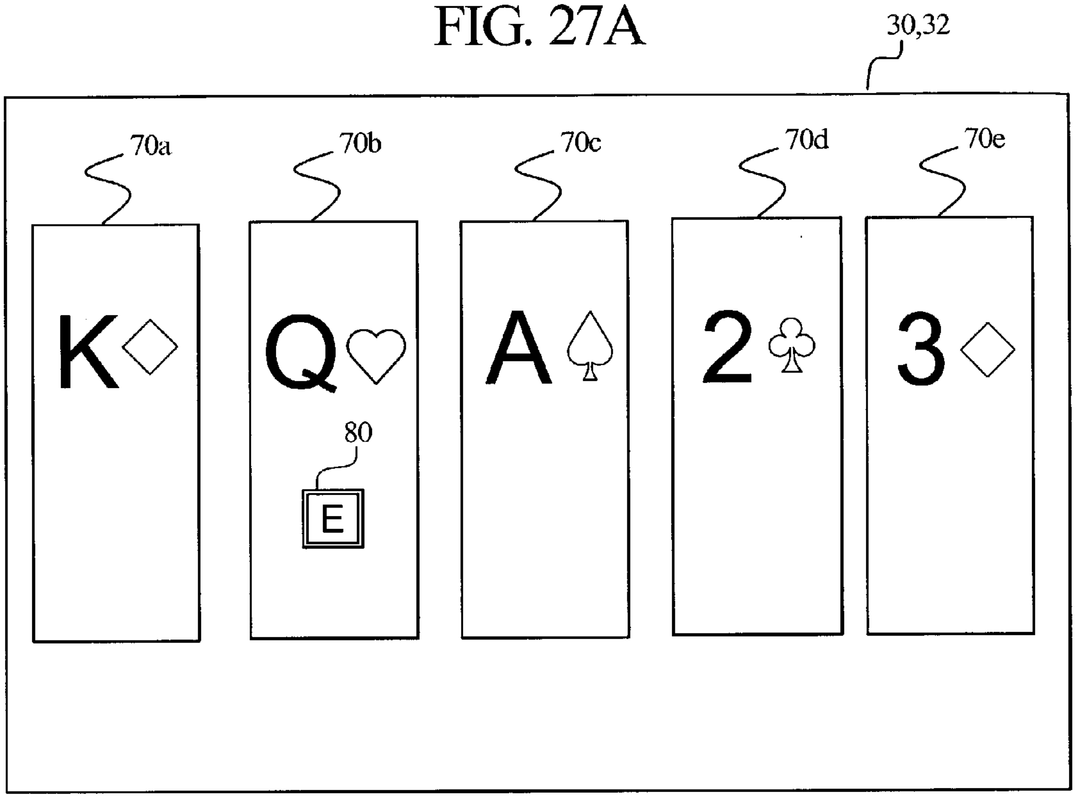
FIGS. 27A and 27B are front plan views of a display device displaying a set of cards in which an extender symbol horizontally extends two symbols across the cards.
Figure 27B:
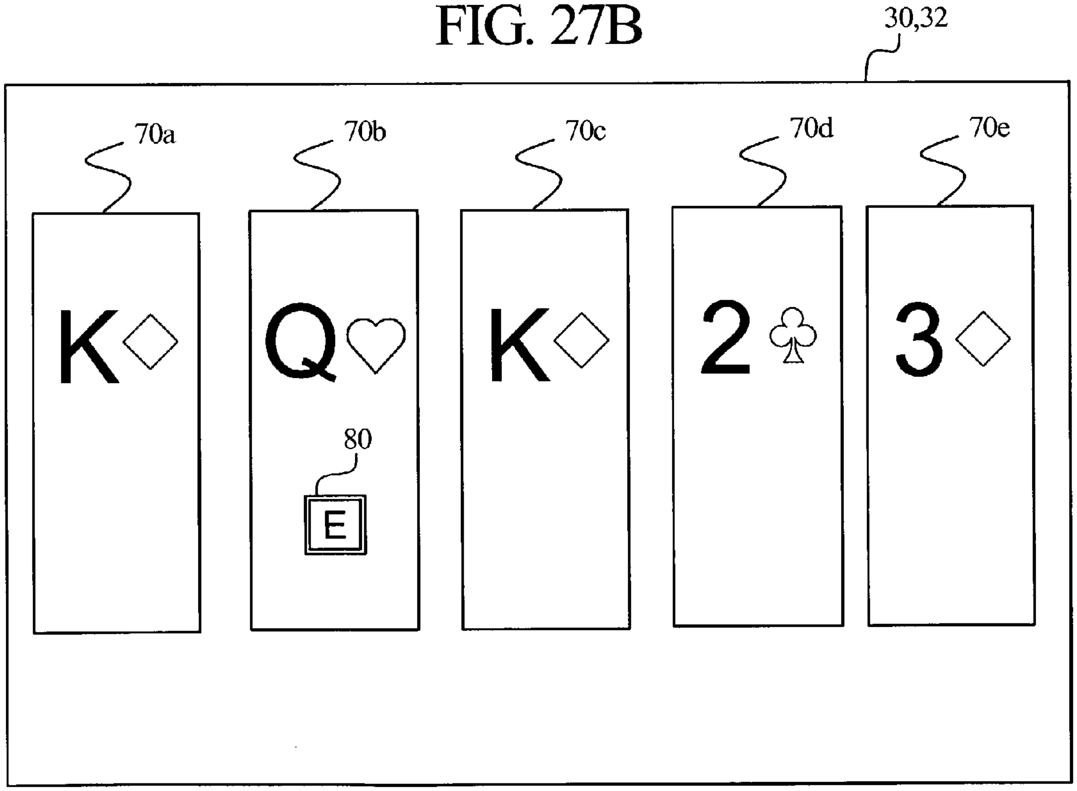

Referring to FIGS. 27A and 27B, a further alternative embodiment of the present invention is illustrated where the extender symbol is included on one or more playing cards. The gaming device displays or deals five playing cards to a player as shown in FIG. 27A. In this example, the cards 70*a*, 70*b*, 70*c*, 70*d* and 70*e* include the King of diamonds, Queen of hearts, Ace of clubs, two of clubs and three of diamonds, respectively. The extender symbol 80 appears on card 70*b* and extends one or more of the symbols on the cards. In one embodiment, the extender symbol extends one of the adjacent card symbols across the cards such as the King symbol. In another embodiment, the extender extends both symbols across the cards such as the King symbol and the suit symbol (i.e., hearts, clubs). Moreover, the extender may extend a symbol across one or more cards as desired. In another embodiment, the extender symbols acts as a wild symbol as described above.

Referring to FIG. 27B, the extender symbol 80 extends both symbols of card 70*a*, the King symbol and the diamond symbol, across card 70*b* to card 70*c*. Now card 70*c* is also a King of diamonds. In this example, the extender symbol does not act as a wild symbol. Therefore, the player obtains two pair (i.e., two king of diamond cards) resulting as a result from the extension function performed by the extender symbol 80.

While the present invention is described in connection with what is presently considered to be the most practical and preferred embodiments it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a plurality of reels;

a processor which controls the reels; and a plurality of symbols on the reels, wherein said symbols include a plurality of non-wild symbols and at least one extender symbol;

wherein when the processor activates the reels and the extender symbol is randomly generated on the reels, the processor causes at least one symbol which is randomly generated on the reels to change to one of the non-wild symbols which is randomly generated on the reels by extending at least one symbol which is randomly generated on the reels across a number of the reels and provides any award to the player for winning combinations of the symbols on the reels.

2. The gaming device of claim 1, wherein the extender symbol also functions as a wild symbol.

3. The gaming device of claim 1, wherein the number of reels is predetermined.

4. The gaming device of claim 1, wherein the number of reels is randomly determined.

5. The gaming device of claim 1, wherein when the extender symbol is randomly generated on the reels, the processor vertically or diagonally extends at least one symbol randomly generated on the reels to one of the reels.

6. A gaming device comprising:

a display device;

a plurality of cards adapted to be selected by the processor and displayed by the display device;

a plurality of symbols on the cards said symbols including at least one extender symbol and a plurality of non-wild symbols; and a processor which randomly selects and causes the display device to display a plurality of the cards to the player, causes at least one symbol on the displayed cards to change to a non-wild symbol on the displayed cards when the extender symbol is displayed on the selected cards by extending at least one symbol which is randomly generated on the displayed cards across a number of the displayed cards, and provides any award to the player for winning combinations of the displayed cards.

7. The gaming device of claim 6, wherein the extender symbol also functions as a wild symbol.

8. The gaming device of claim 6, wherein the number of displayed cards is predetermined.

9. The gaming device of claim 6, wherein the number of displayed cards is randomly determined.

10. A method of operating a gaming device, said method comprising the steps of:

(a) displaying a plurality of reels having a plurality of symbols including at least one extender symbol and a plurality of non-wild symbols;

(b) activating said reels to randomly generate a plurality of said symbols on the reels;

(c) changing at least one symbol which is randomly generated on the reels to a non-wild symbol which is randomly generated on the reels when the extender symbol is randomly generated on the reels by extending at least one symbol which is randomly generated on the reels across a number of the reels; and (d) providing any award to the player for winning combinations of symbols on the reels.

11. The method of claim 10, which includes the step of changing the extender symbol to one of the symbols which is randomly generated on the reels.

12. The method of claim 10, wherein the number of reels is predetermined.

13. The method of claim 10, wherein the number of reels is randomly determined.

14. The method of claim 10, wherein the gaming device is operated through a data network.

15. The method of claim 14, wherein data network is an internet.

16. A method of operating a gaming device, said method comprising the steps of:

(a) displaying a plurality of cards from a deck of cards, said deck of cards including at least one card with an extender symbol and a plurality of cards with non-wild symbols;

(b) changing at least one symbol on the displayed cards to a non-wild symbol on the displayed cards when the extender symbol is displayed on the cards by extending at least one symbol which is randomly generated on the displayed cards across a number of the displayed cards; and (c) providing any award to the player for winning combinations of symbols on the displayed cards.

17. The method of claim 16, which includes the step of changing the extender symbol to one of the symbols displayed on the cards.

18. The method of claim 16, wherein the number of displayed cards is predetermined.

19. The method of claim 16, wherein the number of displayed cards is randomly determined.

20. The method of claim 16, wherein the gaming device is operated through a data network.

21. The method of claim 20, wherein data network is an internet.

* * * * *